US011082397B2

(12) United States Patent
Kim et al.

(10) Patent No.: US 11,082,397 B2
(45) Date of Patent: Aug. 3, 2021

(54) MANAGEMENT SYSTEM AND METHOD FOR REMOTE CONTROLLER OF ELECTRONIC DEVICE

(71) Applicant: SAMSUNG ELECTRONICS CO., LTD., Suwon-si (KR)

(72) Inventors: Shinhyun Kim, Suwon-si (KR); Taeho Kim, Seoul (KR); Hongkyun Kim, Seoul (KR); Hyomin Oh, Incheon (KR); Yongwan Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/983,151

(22) Filed: Aug. 3, 2020

(65) Prior Publication Data

US 2020/0366646 A1 Nov. 19, 2020

Related U.S. Application Data

(63) Continuation of application No. 16/682,175, filed on Nov. 13, 2019, now Pat. No. 10,735,377, which is a
(Continued)

(30) Foreign Application Priority Data

May 22, 2013 (KR) .................. 10-2013-0057916

(51) Int. Cl.
*H04L 29/06* (2006.01)
*G06F 9/451* (2018.01)
(Continued)

(52) U.S. Cl.
CPC .......... *H04L 63/0227* (2013.01); *G06F 9/452* (2018.02); *H04M 1/72415* (2021.01);
(Continued)

(58) Field of Classification Search
CPC ... H04L 67/025; H04L 63/0227; G06F 3/038; G06F 3/033; G06F 9/452;
(Continued)

(56) References Cited

U.S. PATENT DOCUMENTS 7,890,570 B2 * 2/2011 Mazzaferri ........... G06F 3/0484
709/202
8,499,250 B2 7/2013 Wetzer
(Continued)

FOREIGN PATENT DOCUMENTS

CN 103209200 7/2013
EP 2 150 052 A1 2/2010
(Continued)

OTHER PUBLICATIONS

"The Remote Framebuffer Protocol"—Richardson et al, Internet Engineering Task Force, Mar. 2011 https://tools.ietf.org/html/rfc6143 (Year: 2011).*
(Continued)

*Primary Examiner* — Randy A Scott
(74) *Attorney, Agent, or Firm* — Sughrue Mion, PLLC

(57) ABSTRACT

A system for remotely controlling an electronic device includes a first electronic device configured to read a frame buffer to compress a screen and transmit the compressed screen, a second electronic device connected to the first electronic device and configured to repeatedly receive the compressed screen, to receive a communication service related event generated in the first electronic device and output the communication service related event, and to receive an event of copying a file between the first electronic device and the second electronic device and pasting the file, and a network configured to form a communication channel between the first electronic device and the second electronic device according to an authentication result of authentica-
(Continued)

10 tion information input into at least one of the first electronic device and the second electronic device.

18 Claims, 17 Drawing Sheets

Related U.S. Application Data continuation of application No. 16/005,112, filed on Jun. 11, 2018, now Pat. No. 10,498,698, which is a continuation of application No. 14/285,178, filed on May 22, 2014, now Pat. No. 9,998,427.

(51) Int. Cl.
*H04W 12/00* (2021.01)
*H04W 12/06* (2021.01)
*H04M 1/725* (2021.01)
*H04M 1/72415* (2021.01)
*H04W 12/50* (2021.01)

(52) U.S. Cl.
CPC ........... *H04W 12/06* (2013.01); *H04W 12/50* (2021.01); *H04M 2250/64* (2013.01)

(58) Field of Classification Search
CPC ......... H04M 1/72533; H04M 2250/64; H04W 12/06; H04W 12/003
See application file for complete search history.

(56) References Cited

U.S. PATENT DOCUMENTS

| | | | |
|---|---|---|---|
| 8,818,941 | B2 | 8/2014 | Kiilerich |
| 9,002,344 | B2 | 4/2015 | Vargas et al. |
| 2005/0257166 | A1 | 11/2005 | Tu |
| 2006/0143180 | A1 | 6/2006 | Peterson |
| 2006/0148500 | A1 | 7/2006 | Glenner et al. |
| 2007/0073717 | A1 | 3/2007 | Ramer |
| 2008/0031425 | A1 | 2/2008 | Glynn |
| 2009/0070404 | A1 | 3/2009 | Mazzaferri |
| 2009/0300510 | A1 | 12/2009 | Gantman et al. |
| 2010/0022233 | A1 | 1/2010 | Jung et al. |
| 2010/0122196 | A1 | 5/2010 | Wetzer et al. |
| 2010/0268810 | A1 | 10/2010 | Sato |
| 2010/0281395 | A1 | 11/2010 | Apted |
| 2011/0093619 | A1 | 4/2011 | Nelson |
| 2011/0246904 | A1* | 10/2011 | Pinto ...................... G06F 9/452 715/740 |
| 2011/0312379 | A1 | 12/2011 | Wallace, Jr. |
| 2012/0028615 | A1* | 2/2012 | Sundaramurthy .... H04M 3/548 455/412.2 |
| 2012/0131092 | A1 | 5/2012 | Kawamura |
| 2012/0278727 | A1 | 11/2012 | Ananthakrishnan |
| 2012/0282914 | A1 | 11/2012 | Alexander |
| 2013/0143540 | A1 | 6/2013 | Kalra |
| 2013/0346562 | A1 | 12/2013 | Kim |
| 2014/0208203 | A1 | 7/2014 | Tang |
| 2014/0285499 | A1 | 9/2014 | Iwasaki |

FOREIGN PATENT DOCUMENTS

| | | |
|---|---|---|
| JP | 2010252005 A | 11/2010 |
| KR | 1017912 | 2/2011 |
| WO | 2013069409 | 5/2013 |

OTHER PUBLICATIONS

"CallTrack: Syncing incoming, outgoing, and missed call logs to Google Calendar"—Android Authority, Apr. 17, 2011 https://www.androidauthority.com/calltrack-app-review-75647/ (Year: 2011).*
"CallTrack: Syncing incoming, outgoing, and missed call logs to Google Calendar"—Android Authority, Apr. 17, 2012 https://www.androidauthority.com/calltrack-app-review-75647/.
"Know more about synchronization"—Heredis, Feb. 12, 2012 http://www.heredis.com/download/Data-Sheet-Syncing.pdf (Year: 2012).
Chinese Office Action dated Feb. 1, 2018, issued in counterpart application No. 201480041828.X, 26 pages.
Communication dated Mar. 12, 2020 from the Korean Intellectual Property Office in application No. 10-2019-0168568.
European Search Report dated Dec. 23, 2016, issued in counterpart application No. 14801138.0—1954, 8 pages.
European Search Report dated Nov. 15, 2018, issued in counterpart application No. 14801138.0—1224, 9 pages.
T. Richardson et al., "The Remote Framebuffer Protocol", rfc 6143, XP015075907 Internet Engineering Task Force (IETF), Mar. 2011, 39 pages.
Richardson et al., "The Remote Framebuffer Protocol", Internet Engineering Task Force, Mar. 2011 https://tools.ietf.org/html/rfc6143 (Year: 2011).

* cited by examiner

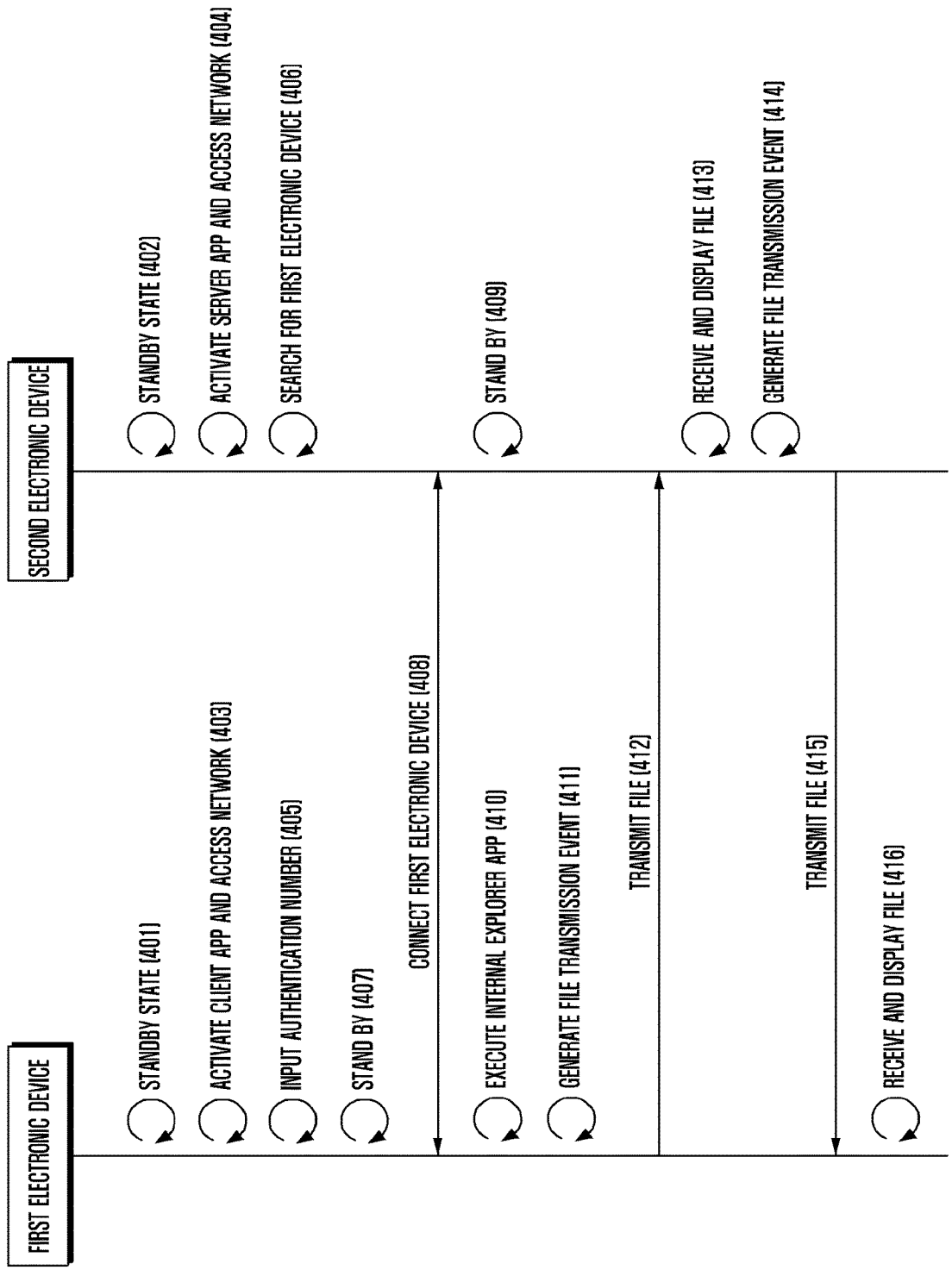

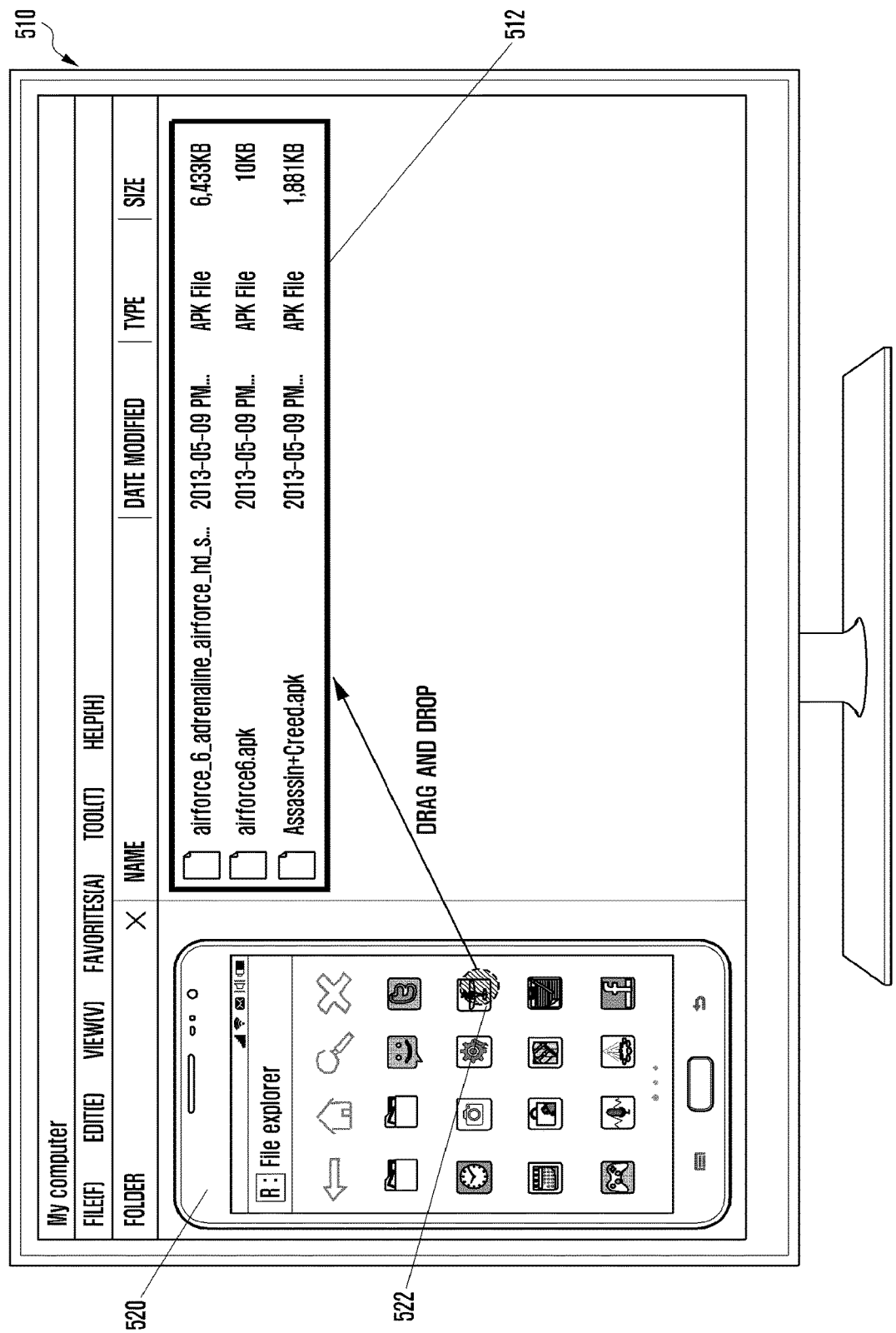

<610>

<620>

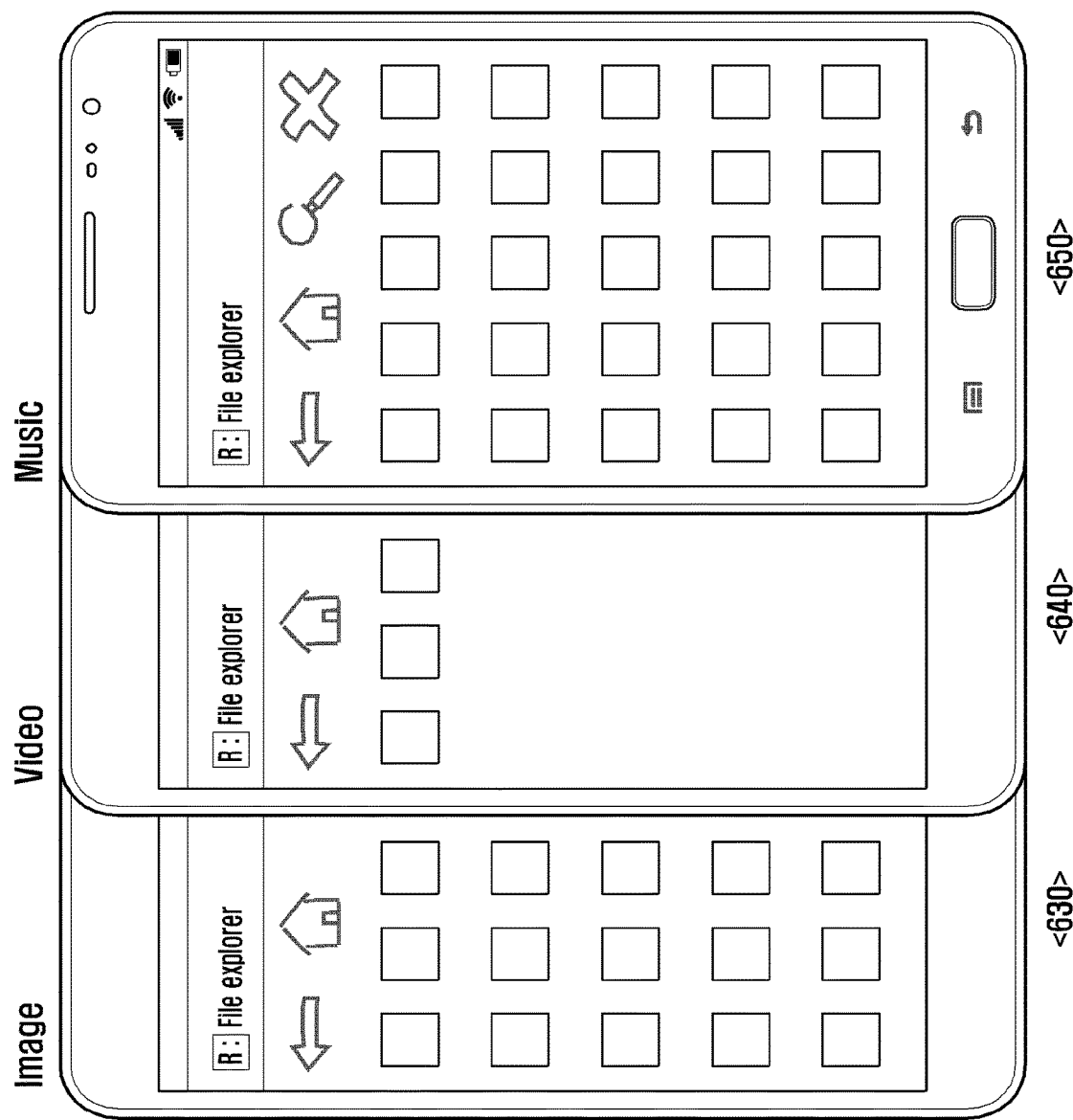

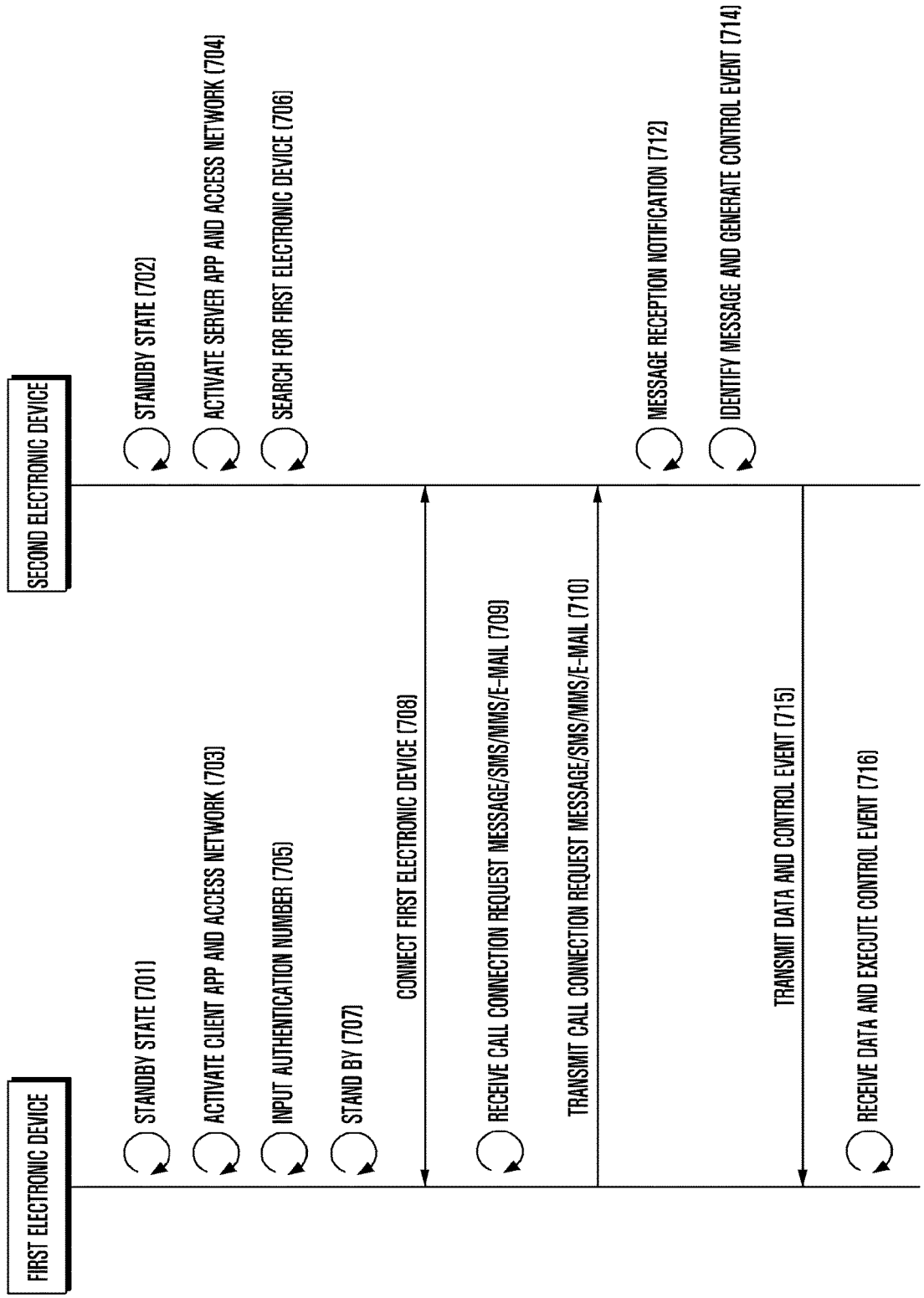

FIG. 12
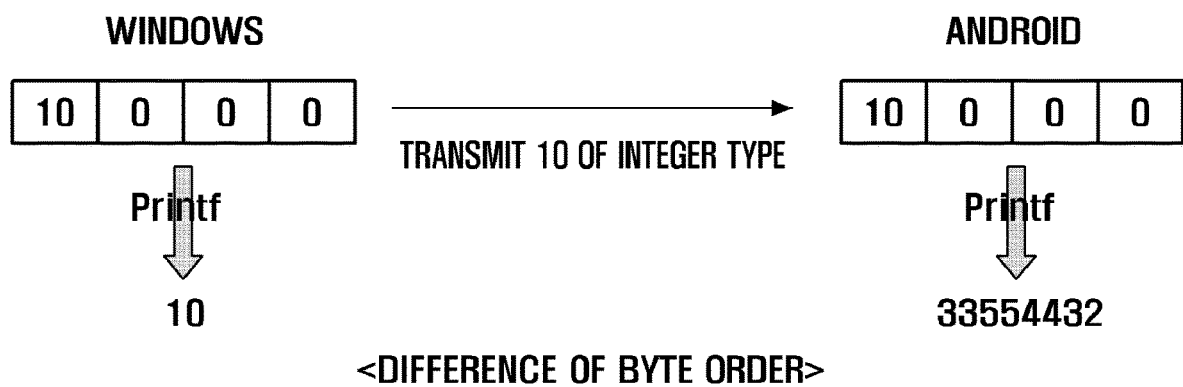
<DIFFERENCE OF BYTE ORDER>
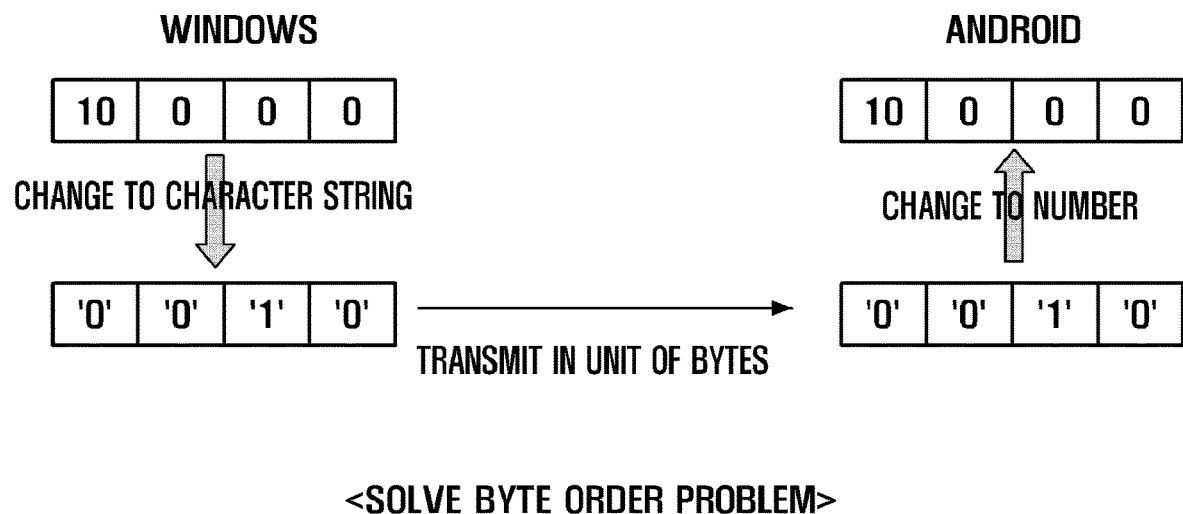
<SOLVE BYTE ORDER PROBLEM>

MANAGEMENT SYSTEM AND METHOD FOR REMOTE CONTROLLER OF ELECTRONIC DEVICE

PRIORITY

This application is a Continuation Application of U.S. patent application Ser. No. 16/682,175, filed Nov. 13, 2019, which is a Continuation Application of U.S. patent application Ser. No. 16/005,112, filed on Jun. 11, 2018, now U.S. Pat. No. 10,498,698, issued Dec. 3, 2019, which is a Continuation Application of U.S. patent application Ser. No. 14/285,178, filed on May 22, 2014, now U.S. Pat. No. 9,998,427, issued Jun. 12, 2018, which claims priority under 35 U.S.C. § 119(a) to Korean Patent Application No. 10-2013-0057916, filed in the Korean Intellectual Property Office on May 22, 2013, the content of each of which is incorporated herein by reference.

BACKGROUND OF THE INVENTION

1. Field of the Invention

The present invention relates generally to an operation of a remote control of an electronic device, and more particularly, to a system for remotely controlling an electronic device and a method of operating the same, in which a user can intuitively transmit a file between a first electronic device and a second electronic device, identify an event generation alarm according to a communication service operation of the first electronic device selectively in the second electronic device, and optimize screen compression and data transmission of the first electronic device.

2. Description of the Related Art

A portable electronic device supports specific user functions and has become popular due to having a small enough size to be carried. Recently, portable electronic devices integratively supporting various user functions have been introduced. The portable electronic device supports user functions and also provides a screen corresponding to the user functions through a display unit. Accordingly, a user consumes a content through the screen according to an operation of the corresponding function while using a specific user function.

Meanwhile, a communication function corresponds to a function which is used by the portable electronic device and other electronic devices in common in most fields. Many users purchase electronic devices to use the communication function and use an immediate and convenient call connection service with other users through the electronic devices. However, the electronic device for making calls is generally designed to have a display unit smaller than or equal to a predetermined size in order to support a portable function. Accordingly, the electronic device for making calls has some limitations in executing the communication function since a size of the display unit of the electronic device is limited. For example, the electronic device for making calls has a difficulty in inputting a text, controlling a screen, or executing a particular content.

Meanwhile, with the recent development of a computing device, many people perform several tasks by using the computing device. Particularly, the computing device used for performing tasks provides a keyboard including a plurality of key buttons, a mouse manufactured to substantially fit a user's hand, a large screen and the like for the purpose of quick work processing, task identification and other purposes. Accordingly, the users can achieve quicker work progress and control other contents by using the computing device. However, the users have difficulties in managing the electronic devices for making calls while using the computing device. That is, since the electronic device for making calls is kept or stored in a separate place during an operation using the computing device, the user cannot immediately identify a particular event related to a communication service which is generated in the electronic device for making calls. Accordingly, conventional users find it burdensome to manage the generation of the particular event of the electronic device for making calls while performing the operations of the computing device and thus have difficulties in properly managing the electronic device for making calls.

SUMMARY OF THE INVENTION

The present invention has been made to address the problems and disadvantages described above and to provide at least the advantages described below. Accordingly, an aspect of the present invention is to provide a system for remotely controlling an electronic device and a method of operating the same which allow a user to intuitively transmit a file between a first electronic device and a second electronic device, allow the user to selectively identify an event generation alarm according to a communication service operation of the first electronic device in the second electronic device, and optimize screen compression and transmission of the first electronic device, such that the user can more quickly and easily acquire various information related to the first electronic device and process the corresponding information.

In accordance with an aspect of the present invention, a system for remotely controlling an electronic device includes a first electronic device configured to read a frame buffer to compress a screen and transmit the compressed screen, a second electronic device connected to the first electronic device and configured to repeatedly receive the compressed screen, to receive a communication service related event generated in the first electronic device and output the communication service related event, and to receive an event of copying a file between the first electronic device and the second electronic device and pasting the file, and a network configured to form a communication channel between the first electronic device and the second electronic device according to an authentication result of authentication information input into at least one of the first electronic device and the second electronic device.

In accordance with an aspect of the present invention, a method of operating an electronic device remote control system includes forming a communication channel between a first electronic device and a second electronic device, outputting an execution screen of the first electronic device on a display unit of the second electronic device, transmitting a communication service related event generated in the first electronic device to the second electronic device or receiving at least one of an event of copying a file between the first electronic device and the second electronic device and pasting the file and a function control event for controlling a function of the first electronic device, and writing a message corresponding to the communication service related event received by the first electronic device and transmitting the message to the second electronic device, transmitting the copied file to a counterpart device and displaying the copied file on a screen simultaneously, or controlling a function according to the function control event by the first electronic device.

In accordance with an aspect of the present invention, a first electronic device includes a controller configured to execute a client application and read a frame buffer to compress a screen, and a communication unit configured to provide a communication channel connected to a second electronic device by the execution of the client application, to repeatedly transmit the compressed screen to the second electronic device through the communication channel, to transmit a filtered communication related event to the second electronic device, and to receive a generated control command from the second electronic device in response to the communication related event.

In accordance with an aspect of the present invention, a second electronic device includes a controller configured to execute a server application, a communication unit configured to provide a communication channel connected to a first electronic device by the execution of the server application, to receive an execution screen of the first electronic device through the communication channel, to receive a communication related event filtered by the first electronic device, and to transmit a control command generated in response to the communication related event to the first electronic device, and a display unit configured to display the execution screen of the first electronic device received through the communication channel on at least a part of the display unit.

BRIEF DESCRIPTION OF THE DRAWINGS

The above and other aspects, features and advantages of the present invention will be more apparent from the following detailed description in conjunction with the accompanying drawings, in which:

FIG. 4 is a signal flow diagram describing a file transmission/reception function between a first electronic device and a second electronic device of an electronic device remote control function according to an embodiment of the present invention;

FIG. 5 illustrates a screen shot of an electronic device remote control function according to the present invention;

FIGS. 6A to 6C illustrate screen shots of an electronic device remote control function according to the present invention;

FIG. 7 is a signal flow diagram describing a system operating method for remotely processing a second electronic device according to reception of a message of a first electronic device and a call connection request message of an electronic device remote control function according to an embodiment of the present invention;

FIG. 12 is a view describing a method of improving a network communication method of an electronic device remote control function according to an embodiment of the present invention;

DETAILED DESCRIPTION OF EMBODIMENTS OF THE PRESENT INVENTION

Hereinafter, embodiments of the present invention will be described in detail with reference to the accompanying drawings.

In describing the embodiments of the present invention, descriptions related to technical contents which are well-known in the art to which the present invention pertains, and is not directly associated with the present invention, will be omitted. Moreover, detailed descriptions related to configuration elements having substantially identical configurations and functions will be omitted.

For the same reason, in the accompanying drawings, some configuration elements may be exaggerated, omitted, or schematically shown, and a size of each element may not precisely reflect the actual size. Accordingly, the present invention is not restricted by a relative size or interval shown in the accompanying drawings.

According to the system for remotely controlling the electronic device and the method of operating the same according to the present invention, the present invention supports intuitive transmission of files between the first electronic device and the second electronic device through a user interface of the second electronic device.

Further, the present invention allows the user to selectively identify and process an event generation alarm according to a communication service operation of the first electronic device in the second electronic device, so as to support quicker control of the first electronic device and quicker function performance. In addition, the present invention can optimize screen compression of the first electronic device and data transmission to the second electronic device.

Figure 1:
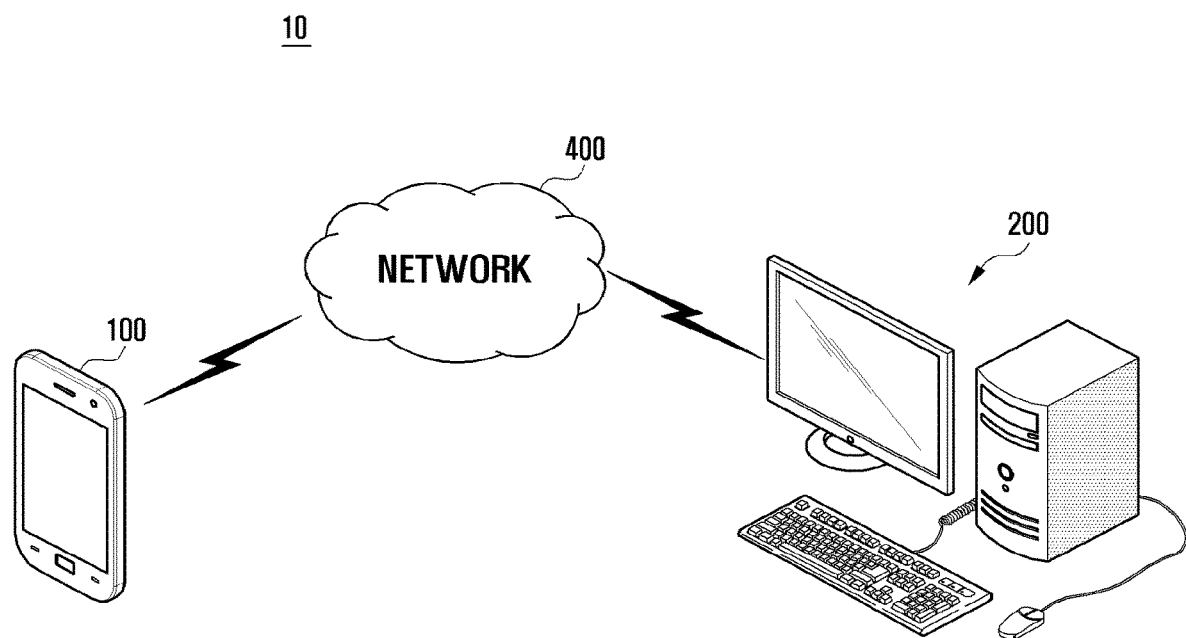
FIG. 1 schematically illustrates a configuration of an electronic device remote control system according to an embodiment of the present invention.

FIG. 1 schematically illustrates a configuration of an electronic device remote control system according to an embodiment of the present invention.

Referring to FIG. 1, an electronic device remote control system 10 according to an embodiment of the present invention includes a first electronic device 100, a second electronic device 200, and a network 400 connecting the first electronic device 100 and the second electronic device 200.

In the electronic device remote control system 10 according to the present invention having the above configuration, the first electronic device 100 forms a communication channel with the second electronic device 200 through the network 400 and particular events generated in the first electronic device 100 are transmitted to the second electronic device 200. Particularly, in the electronic device remote control system 10, a user may identify and process in the second electronic device 200, a particular event according to a voice call, a video call, text message reception, chatting message reception, or the like generated in the first electronic device 100.

Further, the electronic device remote control system 10 may transmit various events to the first electronic device 100 to allow the second electronic device 200 to identify and control a function provided by the first electronic device 100, and the first electronic device 100 may perform a function according to a function control event received from the second electronic device 200 and provide a result of performing the function to the second electronic device 200. At this time, the second electronic device 200 outputs or processes a communication service related event or a state related event and data provided by the first electronic device 100 in real time without storing them.

Particularly, the second electronic device 200 provides an alarm for generation of an event of the first electronic device 100 as a tray icon, so that a minimum alarm can be made without any obstruction to a work environment using the second electronic device 200.

To this end, the network 400 forms a communication channel between the first electronic device 100 and the second electronic device 200. Particularly, the network 400 supports transmission and reception of data for transmitting, receiving, and processing an event according to the present invention between the first electronic device 100 and the second electronic device 200.

The network 400 may include various communication devices which can support a communication scheme according to an electronic device characteristic of the first electronic device 100 and the second electronic device 200. For example, the network 400 may support a formation of a channel based on a WiFi communication module which the first electronic device 100 and the second electronic device 200 can access. Alternatively, the network 400 may be constructed by a REST server for an Android push service for automatic accesses of the first electronic device 100 and the second electronic device 200. Further, an automatic access module may be implemented using a Google app engine corresponding to a cloud service provided by Google.

The network 400 may provide identification information of at least one first electronic device 100 currently forming a communication channel with the network 400 to the second electronic device 200 according to a request of the second electronic device 200. Thereafter, when the second electronic device 200 inputs particular authentication information for forming the communication channel with the first electronic device 100, the network 400 supports formation of the communication channel between the first electronic device 100 and the second electronic device 200.

For example, when an e-mail and a password used for subscription in a smart phone are input, the network 400 makes a request for an access to the REST server. When the e-mail and the password are confirmed, an IP address is transferred to the REST server. The REST server provides the received IP to Android in a push form and an Android smart phone having received the push message automatically accesses a Personal Computer (PC) through the push message. Through such a function, an automatic access is possible without controlling a smart phone located at a remote place.

The network 400 supports a communication channel formation between the first electronic device 100 and second electronic device 200, management of unique information of each device, management of access histories and the like. Further, the network 400 may support accesses of the first electronic device 100 and the second electronic device 200 to a particular server, reception and transmission of a file, and the like.

Particularly, the network 400 provides information for supporting a communication channel between the first electronic device 100 and the second electronic device 200. That is, the network 400 identifies unique information of at least one first electronic device 100 accessing the network 400, manages the unique information in a list form, and provides the corresponding list to the second electronic device 200 according to a request of the second electronic device 200. Further, the network 400 performs a function of re-distributing and managing radio resources according to a release of a connection between the first electronic device 100 and the second electronic devices 200.

The first electronic device 100 supports a communication service function. For example, the first electronic device 100 may support a mobile communication function through a base station or the like. To this end, the first electronic device 100 includes a communication module for supporting the communication service function and generates an event according to performance of a function, such as reception of a call connection request of another electronic device, reception of a text message or a chatting message transmitted by another electronic device, or reception of a file transmitted by another electronic device.

The first electronic device 100 forms a communication channel with the second electronic device 200 through the network 400 in order to transmit the event to the second electronic device 200. Further, the first electronic device 100 may search for various pieces of information, for example, files stored in a file explorer according to a control of the second electronic device 200 and transmit the found files to the second electronic device 200. The first electronic device 100 may be a portable electronic device having a mobile communication function. A configuration of the first electronic device 100 and the roles of respective components will be described in more detail with reference to FIG. 2 below.

The second electronic device 200 forms a communication channel with the first electronic device 100 through the network 400 and outputs an event provided by the first electronic device 100 through an output means, for example, a display unit, an audio processor, or the like. Further, the second electronic device 200 may generate data to process generation of the event of the first electronic device 100 and transmit the data to the first electronic device 100.

In addition, the second electronic device 200 may provide various events to the first electronic device 100 to control performance of a particular function of the first electronic device 100, and receive data according to performance of the corresponding function to output the data. At this time, the second electronic device 200 maintains the continuous communication channel with the first electronic device 100 in order to maintain a continuous connection relation with the first electronic device 100 and receive and notify of an event, and provides a tray icon having a predetermined size on a side of the screen in order to support maintaining the corresponding communication channel and receiving and notifying the event through the communication channel. The second electronic device 200 may be various electronic devices such as a Personal Computer (PC), a notebook, a laptop computer, a slate PC, a mobile large screen electronic device, and the like. A configuration of the second electronic device 200 will be described in more detail with reference to FIG. 3.

As described above, the electronic device remote control system 10 according to an embodiment of the present invention manages and processes, through the second electronic device 200, an event of the first electronic device 100 supporting a communication service function, particularly a call or a text message receiving function, so as to support identification and processing of the event generated in the first electronic device 100 even in a process of performing a particular task or work by using the second electronic device 200.

Particularly, the electronic device remote control system 10 according to the present invention may selectively provide only an event corresponding to an application filtered by a user or a designer in advance to the second electronic device 200. The application corresponding to the event selectively provided to the second electronic device 200 may be filtered in at least one of the first electronic device 100 and the second electronic device 200.

Further, by limiting an alarm of an event or data related to the first electronic device 100 output on the second electronic device 200 to no larger than a predetermined size or providing the alarm or data through a scheme defined in a tray icon, a distribution of a user's concentration can be minimized and information related to the first electronic device 100 can be managed.

Figure 2:
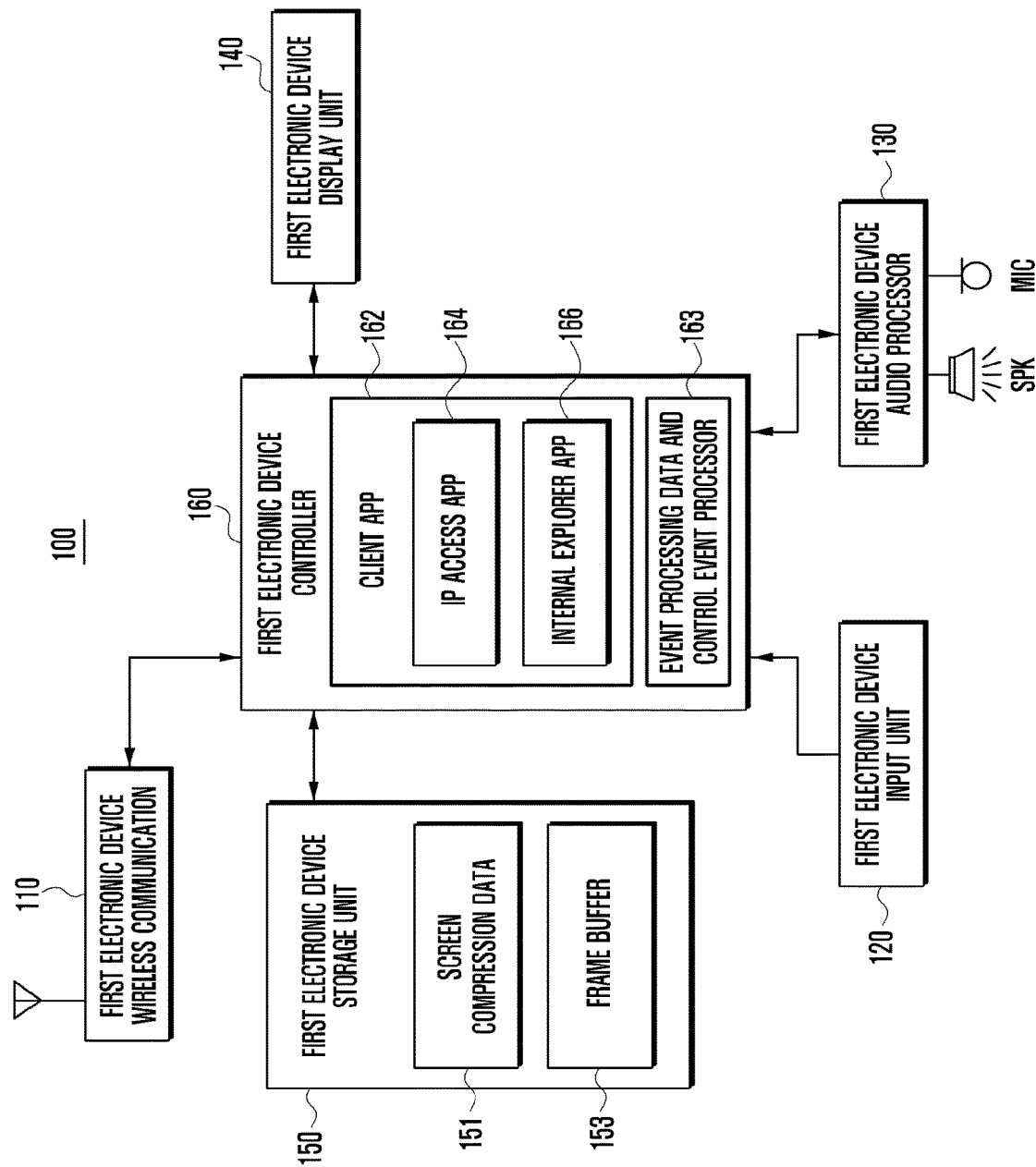
FIG. 2 is a block diagram of a configuration of a first electronic device according to an embodiment of the present invention in more detail.

FIG. 2 is a block diagram of a configuration of the first electronic device 100 according to an embodiment of the present invention in more detail.

Referring to FIG. 2, the first electronic device 100 according to the present invention includes a first electronic device wireless communication unit 110, a first electronic device input unit 120, a first electronic device audio processor 130, a first electronic device display unit 140, a first electronic device storage unit 150, and a first electronic device controller 160.

The first electronic device 100 according to the present invention having such a configuration receives an event related to a communication service through the first electronic device wireless communication unit 110 and transmits the corresponding event to the second electronic device 200. For example, the first electronic device 100 may form a communication channel with the second electronic device 200 through WiFi to transmit the event related to the communication service.

The first electronic device 100 receives data for processing the event related to the communication service from the second electronic device 200 through the first electronic device wireless communication unit 110 and receives an event for controlling a user function which can be supported by the first electronic device 100. When the first electronic device 100 receives the data for processing the event related to the communication service or the event for controlling the user function, the first electronic device 100 supports function performance according to the corresponding data and event and transmit a result thereof to the second electronic device 200. The user function control may include, for example, an event of copying at least one file selected during an execution of an internal explorer application and pasting the file in a file storage area of the second electronic device 200.

To this end, the first electronic device wireless communication unit 110 supports a formation of a channel for supporting a communication service function of the first electronic device 100. For example, the first electronic device wireless communication unit 110 forms a communication channel with a wireless base station prepared for supporting a mobile communication service. Further, the first electronic device wireless communication unit 110 receives a voice call or video call connection request message, a text message, a chatting message, and the like from another electronic device through the base station and receives a particular file which another electronic device desires to transmit to the first electronic device 100. The first electronic device wireless communication unit 110 may be prepared in a form of a mobile communication module to support the communication service function and may be implemented by a communication module for receiving a communication service related event from another electronic device, such as various communication modules for supporting a communication scheme for each generation including 2G, 3G, 4G, or LTE, a communication module for supporting a communication scheme including TDMA, CDMA, WCDMA, FDMA, or OFDMA, or a communication module based on a wired/wireless network, but is not limited to a particular communication technique or scheme. Meanwhile, the first electronic device wireless communication unit 110 may transmit a reception rejection message made and transmitted by the second electronic device 200, a message made in response to the call connection request message, or a text or chatting message to another electronic device according to a control of the first electronic device controller 160.

The first electronic device wireless communication unit 110 may include a communication module for supporting an access to the network 400 by the first electronic device 100. The first electronic device wireless communication unit 110 has unique information and accesses the pre-authenticated network 400. The first electronic device wireless communication unit 110 forms a communication channel with the network 400, and transmits a communication service related event to the second electronic device 200 through the network 400. Further, the first electronic device wireless communication unit 110 may receive data made by the second electronic device 200 in response to the communication service related event from the second electronic device 200, and receive a control event transmitted by the second electronic device 200 to control a particular function supported by the first electronic device 100. The received data and control event may be transmitted to the first electronic device controller 160.

The first electronic device input unit 120 generates various input signals for operating the first electronic device 100. The first electronic device input unit 120 may be configured in a form of a particular key such as a button key, a side key, or a home key and may be provided as a touch map for supporting a full touch screen. The touch map is displayed on the first electronic device display unit 140 and supports generation of an input signal according to a user's touch.

The first electronic device input unit 120 generates an input signal for an access to the network 400, an input signal for releasing the access to the network 400, an input signal for activating a client application for the electronic device remote control according to the present invention, and an input signal for deactivating the client application according to a user's control. When the client application is activated, the first electronic device 100 may automatically control the access to the network through a search. The generated input signal is transmitted to the first electronic device controller 160 and is used as a command for supporting a function corresponding to the corresponding input signal.

The first electronic device audio processor 130 supports processing and collection of various audio signals related to the first electronic device 100. To this end, the first electronic device audio processor 130 includes a speaker SPK for outputting an audio signal and a microphone MIC for collecting an audio signal. The first electronic device audio processor 130 may output a guide sound indicating the access to the network 400 or release of the access, an alarm sound according to generation of an event when the communication service related event is generated, a guide sound indicating successful transmission of a remote control related event to the second electronic device 200, and a guide sound indicating reception of data for processing the remote control related event and reception of an event for controlling a particular user function from the second electronic device 200. Outputs of the aforementioned guide sounds may be determined according to a user setting.

The first electronic device display unit 140 outputs various screens according to the operation of the first electronic device 100. The first electronic device display unit 140 may be formed to have a structure including a touch panel and a display panel for supporting a touch function. The first electronic device display unit 140 may output a screen guiding the access to the network 400 or release of the access, a screen indicating reception of the communication service related event from another electronic device, a screen transmitting the communication related service to the second electronic device 200, and a screen copying a file stored in the first electronic device 100 and pasting the file in a file storage area of the second electronic device 200.

Further, the first electronic device display unit 140 may output a screen performing processing according to data for processing the communication service related processing and the control event, a screen performing processing according to the function control event provided by the second electronic device 200 to perform a particular user function which can be supported by the first electronic device 100, and a screen transmitting a result according to the corresponding processing to the second electronic device 200.

For example, the first electronic device display unit 140 outputs a screen executing a file explorer for transmitting/receiving a file between the first electronic device 100 and the second electronic device 200, a screen performing a file search based on a search word provided by the second electronic device 200, and a filtering option screen for selecting an application to selectively inform the second electronic device 200 of event reception according to a control of the second electronic device 200. Further, the first electronic device display unit 140 outputs various screen interfaces for remote control management according to the present invention.

The first electronic device storage unit 150 stores various application programs required for the operation of the first electronic device 100 and for supporting the function of the electronic device. For example, the first electronic device storage unit 150 may support an operating system (OS) for the operation of the first electronic device 100, a call function supporting program for a call connection, a video call function supporting program for supporting a video call, and a server access supporting program for accessing an external server. Particularly, the first electronic device storage unit 150 stores a client application 162 to support a remote control function according to the present invention.

The client application 162 is a program supporting a electronic device remote control function according to the present invention. When the user of the first electronic device 100 activates the electronic device remote control function, the client application 162 is loaded to the first electronic device controller 160 to support the remote control management function.

The client application 162 includes a routine controlling the access to the network 400 and a routine forming a communication channel with the second electronic device 200 based on a connection request of the second electronic device 200 and authentication information input by the second electronic device 200 according to a user control. Further, the client application 162 may include a routine transmitting, when a communication service related event is generated, the event to the second electronic device 200, a routine receiving data for processing the communication service related event and a control event from the second electronic device 200 when a communication service related event is generated, and a routine performing functions according to the data and the control event. In addition, the client application 162 may include a routine performing a particular function of the first electronic device 100 according to a function control event transmitted by the second electronic device 200 and a routine releasing the access to the network 400 when a request for releasing the communication service management function according to the present invention is made. The client application 162 supports performance of the electronic device remote control function according to the present invention based on the aforementioned routines. Each electronic device remote control function will be described in more detail with reference to the accompanying drawings described below.

Meanwhile, the first electronic device storage unit 150 includes screen compression data 151 and a frame buffer 153.

The frame buffer 153 is a memory unit for temporarily storing image information to be displayed on the screen. A graphic processor converts a display list expressing a figure from a Central Processing Unit (CPU) and records the converted display list in the frame buffer 153. Each unit of memory of the frame buffer 153 corresponds to each pixel of the screen and is directly reflected on the screen. That is, on/off or a color of each point of the screen is stored as a bitmap. When a predetermined content is written in the memory unit, the content is displayed on the screen. A Linux kernel layer takes charge of managing a driver and a memory of Android. The layer also allocates the frame buffer memory. The Linux kernel has in advance information on a display device to use Android, and reads information such as a resolution and a Bit Per Pixel (BPP) of the display device and allocates memory space as required. When Android is executed, the display device reads stored data from a memory space allocated to the Linux kernel and outputs the read data. However, a library layer corresponding to a higher layer allocates a virtual frame buffer, not the memory allocated by the Linux kernel layer. This is to prevent a program developed by a developer from directly approaching the frame buffer. Accordingly, a library managing a surface of the library layer receives information on the display device from the Linux kernel and reallocates the corresponding memory.

Since the data displayed on the screen exists in the virtual frame buffer 153, the first electronic device controller 160 reads the frame buffer 153 to execute a JPEG compression in the same way as that of Windows and stores the screen compression data 151. Thereafter, by repeatedly transmitting the screen compression data 151 through network communication, the screen of Android can be transmitted to the second electronic device 200. Accordingly, the second electronic device 200 can output the screen transmitted from the first electronic device in real time.

Figure 11:
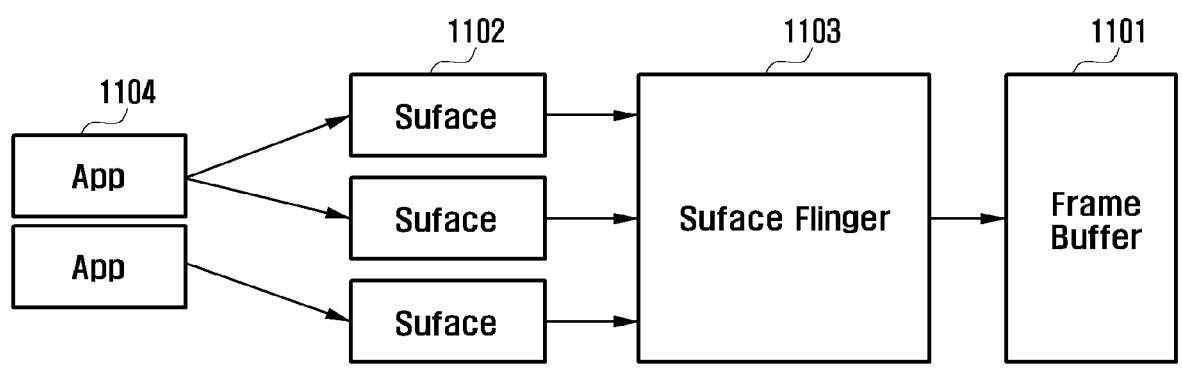
FIG. 11 is a block diagram describing a frame buffer and a surface flinger for screen transmission according to an embodiment of the present invention.

A process of outputting the screen of Android will be described with reference to FIG. 11. All images are output from the frame buffer 1101. That is, various surfaces 1102 generated by the applications 1104 are combined and the frame buffer 1101 is updated by a surface flinger 1103. At this time, the surface flinger 1103 may perform a function of combining composers, a function of combining 2D and 3D surfaces or combining various application surfaces, a function of transmitting a buffer by Binder IPC (Inter Process Communication) Calls, a function of accelerating H/W (Hard Ware) or using Open GL ES (OpenGL for Embedded Systems, e.g, which is a 3D Application Programming Interface), and a double buffering function for Page Flip In other words, in consideration of a type, a size, and a position of various surfaces 1102, the surface flinger 1103 combines and converts them into a bitmap of RGB or ARGB (Alpha, Red, Green, Blue, in which "Alpha" specifies an opacity value for a color) and writes the bitmap in the frame buffer.

Referring back to FIG. 2, the first electronic device controller 160 extracts the frame buffer 153, reads the frame buffer 153, executes a JPEG compression in the same way as that of Windows, and stores the compression data 151.

The first electronic device controller 160 supports supply and distribution of power required for the operation of the first electronic device 100, and transmission and processing of a signal. Particularly, the first electronic device controller 160 performs various controls for supporting a remote control function according to an embodiment of the present invention. To this end, the first electronic device controller 160 executes the client application 162.

The client application 162 includes an IP access application 164 and an internal explorer application 166.

The IP access application 164 is an application for a connection with a server and may acquire a user right required for a connection between the second electronic device 200 and the network and provide a function such as a key input related driver installation and a package filtering option.

Specifically, by inputting an e-mail address and a password registered as authentication information in subscription to the electronic device remote control program according to the present invention into the second electronic device 200, a request for accessing the first electronic device 100 is transmitted to a network server. When the e-mail address and the password are confirmed, the second electronic device 200 transmits an IP address of the second electronic device 200 to the network server. The network server transmits the received IP address to the IP access application 164 of the first electronic device 100 in a push form, and the IP access application 164 having received the push message automatically accesses the second electronic device 200 through the received IP address. Through such a function of the IP access application 164, it is possible to perform an automatic access without any control of the first electronic device 100 located in a remote place.

When the first electronic device 100 and the second electronic device 200 are successfully connected to each other by the IP access application 164, the client application 162 transmits the screen compression data 151 to the second electronic device 200 after setting information such as a screen resolution and the like.

The client application 162 is activated according to an activation of the remote control function of the first electronic device 100 and transmits a communication service related event received by the first electronic device wireless communication unit 110 and a screen according to the reception of the corresponding event to the second electronic device 200.

For example, when the client application 162 receives a call connection request message from another electronic device, the client application 162 supports an output of a screen corresponding to the call connection request message on the first electronic device display unit 140 and supports transmission of the corresponding message to the second electronic device 200 through the network 400.

Meanwhile, the client application 162 may transmit an event for all notification or Toast (a pop-up window in android system, e.g.) of the first electronic device 100, that is, a communication service related event to the second electronic device 200, but may control to transmit only an event filtered by a user or a designer to be selectively transmitted to the second electronic device 200 through a filtering option.

Figure 10:
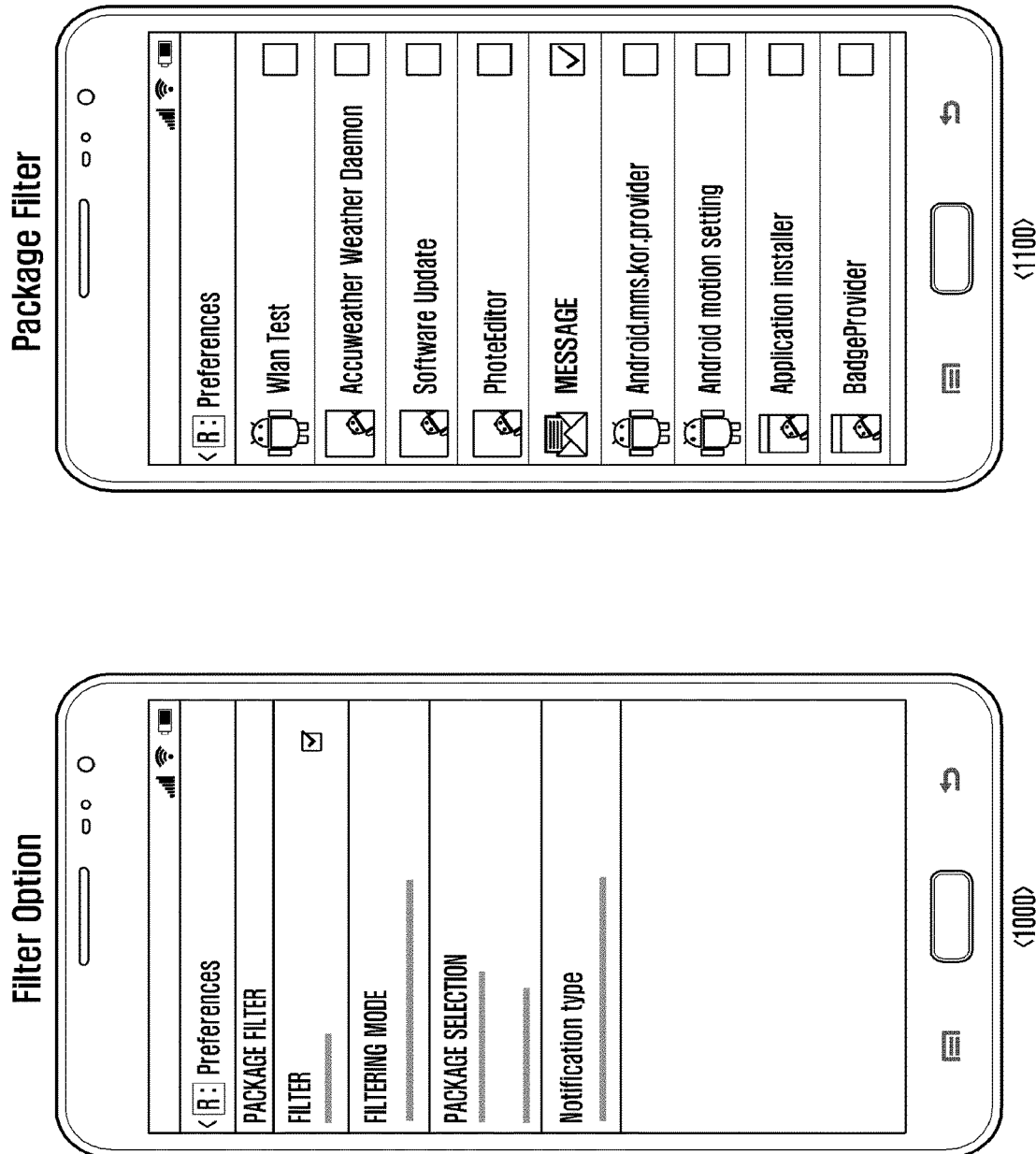
FIG. 10 illustrates a screen shot describing message reception and processing of a communication service managing function according to an embodiment of the present invention.

For example, referring to FIG. 10, when the user selects a message application in an application filter option execution screen 1000 of the first electronic device 100, a text reception event received by the first electronic device 100 may be transmitted to the second electronic device 200 in an alarm form through the network 400. Information on the remaining software update applications is not transmitted to the second electronic device 200.

A method of fetching a package name from the application installed in the first electronic device 100 is described below. Through an InstalledPackages( ) function of a package manager, package information (package Info) currently installed in the electronic device may be fetched. At this time, when the user calls a package name (packageName) of the package information in a position (designated location) of an application designated by the user from the fetched package information, a package name in a string form is fetched. The extracted package name is managed in a list form and only notification of an application included in the corresponding list may be received.

Further, when client application 162 receives a particular file from another electronic device, the client application 162 controls a message for a file reception completion to be transmitted to the second electronic device 200 through the network 400 when the reception of the corresponding file is completed.

In addition, when the client application 162 transmits the communication service related event of the first electronic device 100 to the second electronic device 200 and then the second electronic device 200 transmits data made to process the corresponding communication service and a control event, the client application 162 receives the data and the control event and process the corresponding communication function based on the received data and control event.

For example, when a control event instructing reception and transmission of particular data for a call connection request message is received from the second electronic device 200, an event processing data and control event processor 163 may control a message including the data received from the second electronic device 200 to be transmitted to another electronic device as a response to the reception of the call connection request message. During such a process, the client application 162 controls the call connection request message to be call-switched to another predefined phone number or to be maintained in a call non-acceptance state.

Further, when the client application 162 transmits a text message or a chat message generated in the first electronic device 100 to the second electronic device 200 and receives a corresponding text message or chat message from the second electronic device 200, the client application 162 controls the corresponding message to be transmitted to another electronic device.

In addition, the client application 162 may transmit status information of the first electronic device 100 to the second electronic device 200. More specifically, the client application 162 may provide at least one of reception status information of a message, a multimedia message, an e-mail, or a chat message generated in the first electronic device 100, battery residual amount information, operation status information of a short-range communication module, operation status information of a position information collection sensor, communication function related status information, and the particular user program being executed in the first electronic device 100, for example, music file play related information to the second electronic device 200.

The internal explorer application 166 is a file explorer functioning to search for files of the electronic device and may be an application for transmitting/receiving a file to/from the network server. Further, the internal explorer application 166 searches for files of the first electronic device 100 and may register an image, a video, music, or a custom index (extension) to more conveniently search for a file. In addition, the internal explorer application 166 may provide a function selecting a file for transmitting/receiving the file between the first electronic device 100 and the second electronic device 200.

Figure 6A:
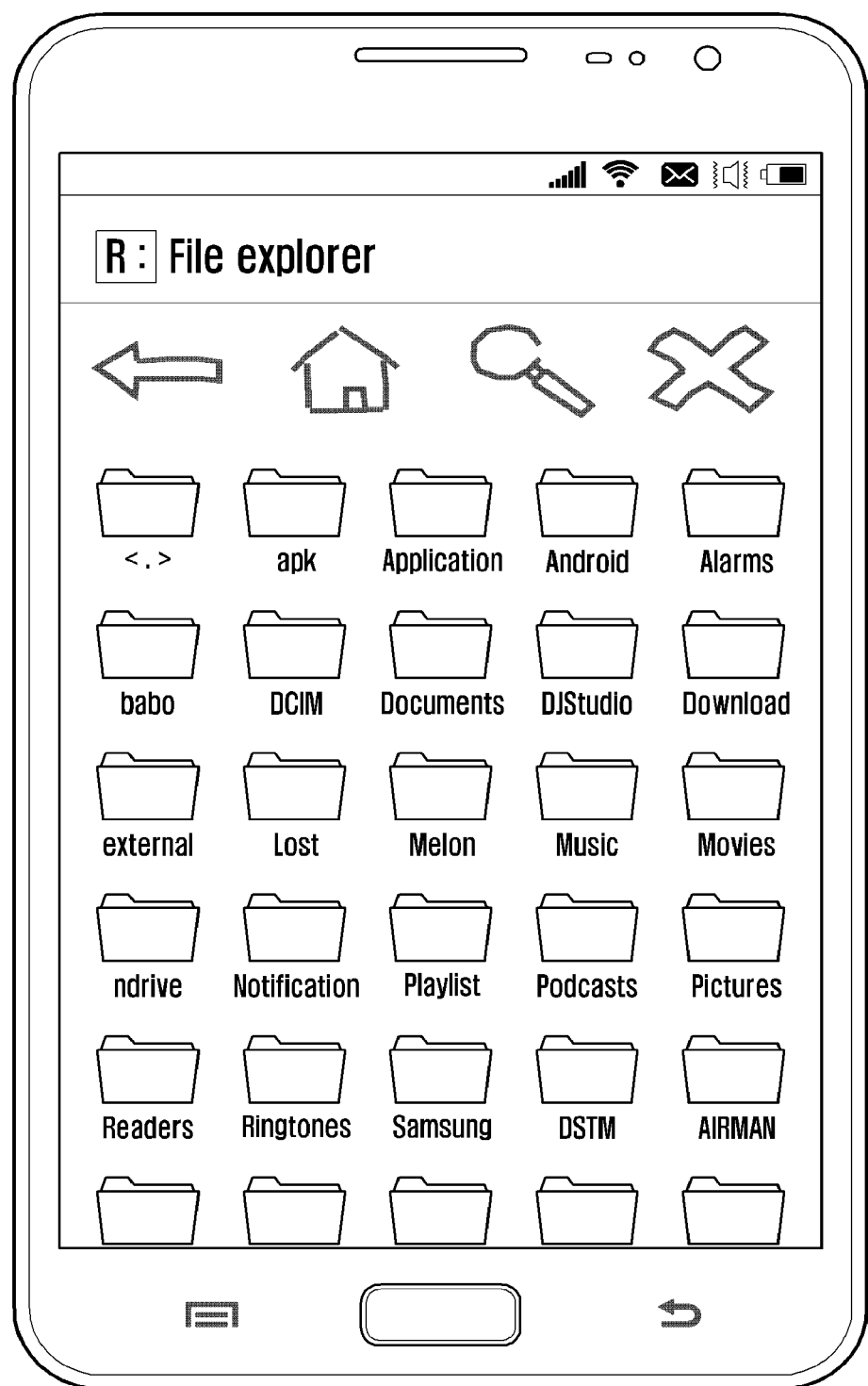
Figure 6B:
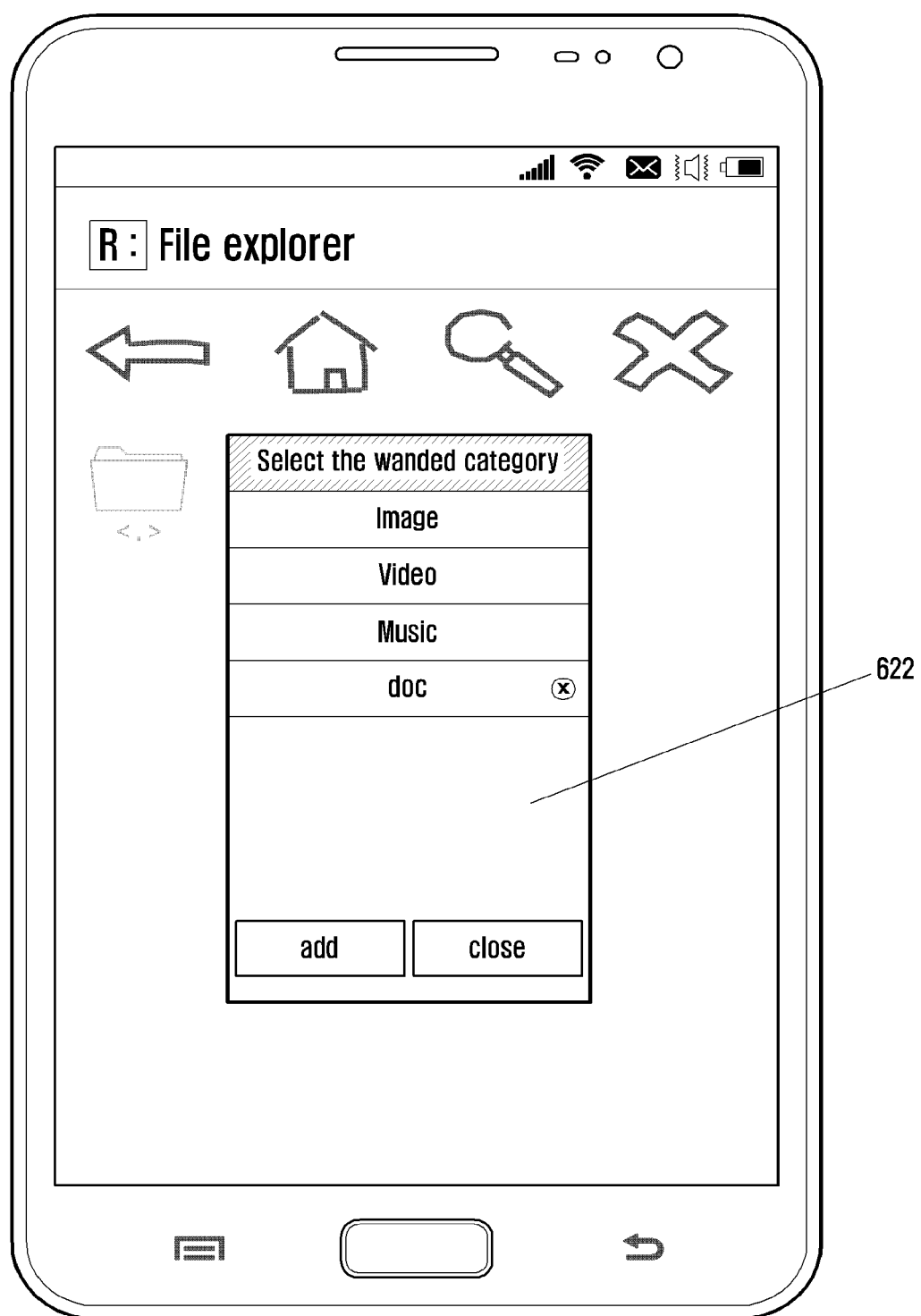

Referring to FIG. 6A, a main screen 610 of a file explorer for transmission/reception is illustrated, and the internal explorer application 166 can search for each path and may include additional functions on an upper portion. For example, by moving to a higher path of a current path or moving along an optimal path of /mnt/sdcard/ by which actual files have been installed and used, a movement to a home path is possible. As illustrated in FIG. 6B, a category search and a search for an expansion or an index added by the user can be performed. An execution screen 620 of the internal explorer application 166 displays a category search popup window 622, and the search popup window 622 includes a function of searching for an image, a video, music, and a document file corresponding to a default function. The present invention is not limited thereto and an index which the user desires may be added and then searched for.

Referring to FIG. 6C, an execution screen 630 shows a result of an image file found by the internal explorer application 166, an execution screen 640 shows a result of a video file found by the internal explorer application 166, and an execution screen 650 shows a result of a music file found by the internal explorer application 166.

A search for an image, a video, or music may be quickly made using a media store API basically provided by Android and thus a thumbnail may be extracted. Since a memory error may occur when a thumbnail of a picture, an image or music is loaded from the media store, when a view adapter calls an overwrite function of getView( ) the adapter extracts a thumbnail with respect to a file which does not load bitmap information of the thumbnail by using a background thread. When the thumbnail is extracted, the adapter calls a notify- DataSetChanged( ) function and scatters the extracted thumbnail. However, such as method may also generate a memory error. A problem with a view adapter provided by Android is that, when a particular position of the adapter on an activity is extracted, a getView( ) overwrite function is repeatedly called, not called only once. At this time, when 20 to a maximum of 40 to 50 bitmap extraction background threads are activated, if many bitmaps are extracted and scattered to the view at one time, the memory error may occur.

Accordingly, in order to solve the problem of getView( ) when getView( ) is called, only 15 or less threads are made through a background thread count extracting a bitmap and thus a maximum of 15 bitmaps are extracted and counts are reduced. Then, a bitmap of a currently activated position which has not been extracted is continuously extracted from the getView( ) overwrite function, thereby preventing the memory error and extracting the bitmap.

That is, in an embodiment of the present invention, when a file of the internal explorer is extracted as a thumbnail, a preset number of threads are extracted and scattered to the view by using the background thread count extracting the bitmap, and thus a bitmap of a currently activated position which has not been extracted is continuously extracted, thereby preventing the memory error and extracting the bitmap.

The execution screen of the internal explorer application 166 is transmitted to the second electronic device 200 through the first electronic device wireless communication unit 110 and may be displayed on the second electronic device display unit 240 when a network connection with the second electronic device 200 is maintained.

Referring to FIG. 5, when the user selects at least one file on a file explorer execution screen 520 of the first electronic device 100 displayed on the second electronic device display unit 240, performs a long click on the selected file 522, and then generates a control event such as a drag and drop on an execution screen 512 of the second electronic device 200, the selected file 522 is transmitted to the second electronic device 200 through the first electronic device wireless communication unit 110 and the transmitted file 522 may be displayed on the execution screen 512 of the second electronic device 200.

Meanwhile, a server application may support both a landscape mode and a portrait mode of the first electronic device execution screen 520. Accordingly, based on the landscape mode or the portrait mode of the first electronic device display unit 140, a size of a window of the execution screen 520 of the first electronic device output to the second electronic device display unit 240 may be changed. For example, when the screen of the first electronic device display unit 140 is switched to the landscape mode from portrait mode during the output of the first electronic device execution screen 520, the execution screen 520 of the first electronic device output to the second electronic device display unit 240 may also be switched to a landscape window from a portrait window automatically. Alternatively, the execution screen 520 of the first electronic device may be manually switched by the user.

As described above, the first electronic device 100 according to the embodiment of the present invention is directly connected to the second electronic device 200 in a 1:1 correspondence through the network 400. When a communication service related event is generated, the first electronic device 100 transmits the corresponding event to the second electronic device 200 and supports an execution of a communication service management function according to data and a control event received from the second electronic device 200. Accordingly, the user can remotely control a communication service related function or a particular function of the first electronic device 100 through the second electronic device 200 without directly controlling the first electronic device 100.

Figure 3:
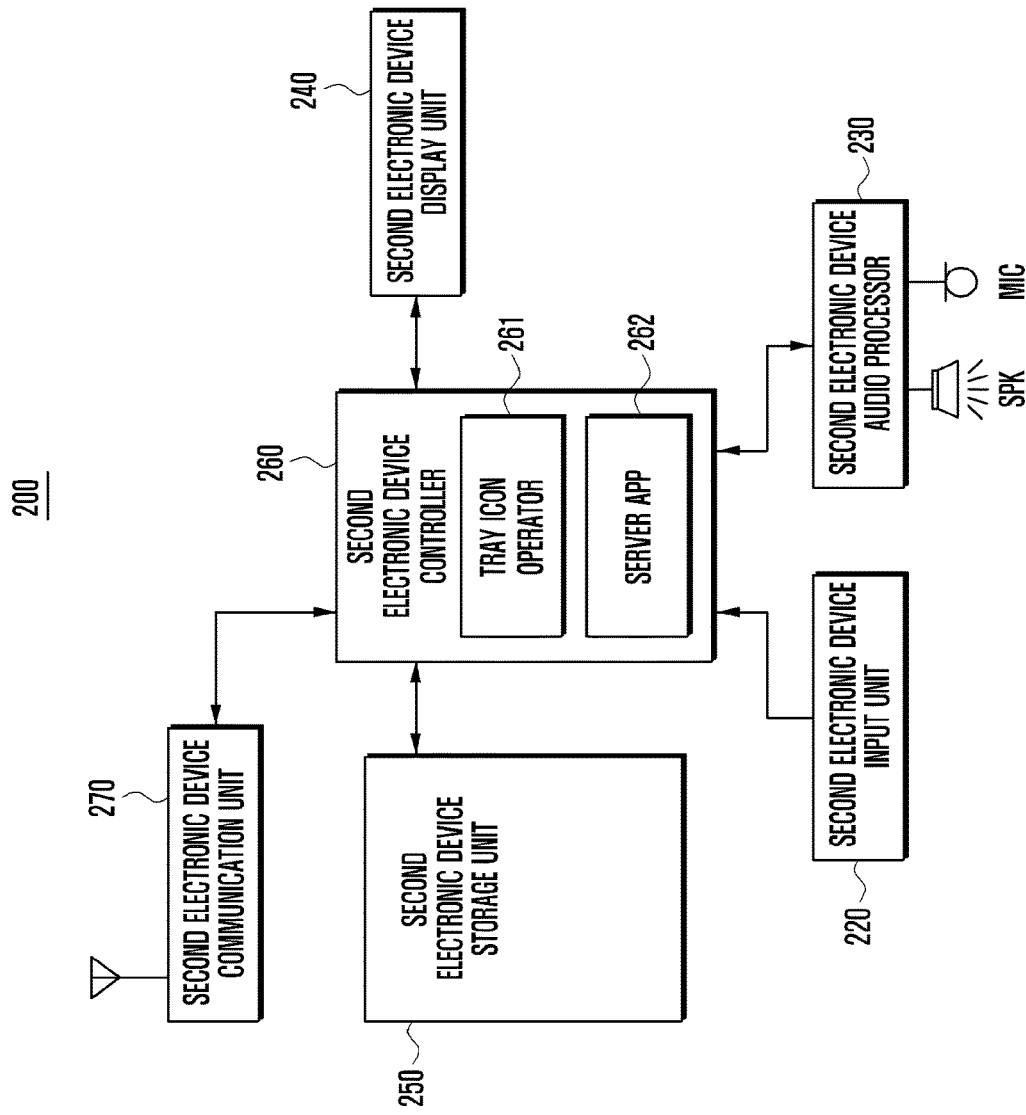
FIG. 3 is a block diagram of a configuration of a second electronic device according to an embodiment of the present invention in more detail.

Meanwhile, FIG. 3 illustrates a configuration of the second electronic device 200 according to an embodiment of the present invention in more detail.

Referring to FIG. 3, the second electronic device 200 according to the present invention includes a second electronic device input unit 220, a second electronic device audio processor 230, a second electronic device display unit 240, a second electronic device storage unit 250, a second electronic device controller 260, and a second electronic device communication unit 270.

The second electronic device 200 according to the present invention having the above configuration forms a communication channel with the first electronic device 100 through the network 400 by using the second electronic device communication unit 270. Further, the second electronic device 200 receives a communication service related event from the first electronic device 100 through the second electronic device communication unit 270 and transmits data for processing the corresponding communication service related event and a control event to the first electronic device 100. In addition, the second electronic device 200 may transmit a function control event for controlling a particular electronic device function supported by the first electronic device 100 through the second electronic device communication unit 270, receive a result according to the corresponding function control event, and output the result. Particularly, the second electronic device 200 may output an event and result data transmitted by the first electronic device 100 on a tray icon. During such a process, the second electronic device 200 controls the event and the result data to be suitable for a standard of the tray icon and outputs a controlled text, icon, image and the like.

As described above, the second electronic device communication unit 270 forms a communication channel with the network 400 and ultimately supports a formation of a 1:1 communication channel with the first electronic device wireless communication unit 110 of the first electronic device 100. The second electronic device communication unit 270 is automatically activated when a particular menu item prepared to activate the electronic device remote control function according to the present invention is activated.

Further, the second electronic device communication unit 270 may receive a list of one or more first electronic devices 100 accessing the network 400 from the network 400. Thereafter, the second electronic device communication unit 270 transmits authentication information for a communication connection with a particular first electronic device 100 and forms a communication channel with the first electronic device 100 according to an authentication confirmation.

The second electronic device input unit 220 generates various input signals for operating the second electronic device 200. The second electronic device input unit 220 may include various input means such as a keyboard, a mouse, a touch pad, a voice input unit and the like and may also include input means such as a button key, a touch key and the like. Further, the second electronic device input unit 220 may be configured in a form of a touch map. In this event, the touch map is displayed on the second electronic device display unit 240 supporting a touch function to support an input function. The second electronic device input unit 220 may be transformed to various forms of input means to support various work or tasks performed through the second electronic device 200. Particularly, when the second electronic device input unit 220 receives a communication service related event from the first electronic device 100, the second electronic device input unit 220 generates an input signal corresponding to data for processing the corresponding communication service related event or an input signal corresponding to a control event for controlling to process input data based on the first electronic device 100. In addition, the second electronic device input unit 220 may generate an input signal corresponding to a function control event for controlling an electronic device function supported by the first electronic device 100. The input signal generated by the second electronic device input unit 220 is transmitted to the second electronic device controller 260 and used as a command for supporting the electronic device remote control according to the present invention.

The second electronic device audio processor 230 outputs an audio signal generated by the operation of the second electronic device 200 or supports collection of the audio signal according to whether a function of the second electronic device 200 is supported. The second electronic device audio processor 230 may output various audio signals and guide sounds related to the communication service management function of the first electronic device 100. For example, the second electronic device audio processor 230 may output a guide sound informing a user of an access to the network 400 by the second electronic device 200, a guide sound informing the user of a completion of the communication connection with the first electronic device 100, a guide sound informing the user of reception of the communication service related event, a guide sound informing the user of transmission of data for processing the corresponding event and a control event, a guide sound informing the user of transmission of a function control event, and a guide sound informing the user of termination of a communication service management function when each function is performed. The guide sound output function may be omitted according to a user setting or a design intention of a designer.

The second electronic device display unit 240 outputs various screens generated during the operation of the second electronic device 200. For example, the second electronic device display unit 240 may output a screen according to the operation of the remote control function according to the present invention and various work or task screens based on the second electronic device 200.

Particularly, the second electronic device display unit 240 may output a tray icon for the operation of the remote control function according to the present invention on one side of the screen. The tray icon may be activated according to performance of the electronic device remote control function of the first electronic device 100 and output on one side of the second electronic device display unit 240, for example, a lower right edge area in a predetermined size. The tray icon provides various pieces of information according to the electronic device remote control function of the present invention in the form of a text, an image, or the like.

Various screen interfaces through the second electronic device display unit 240 will be described in more detail with reference to the accompanying drawings described below.

The second electronic device storage unit 250 stores an operating system (OS) required for the operation of the second electronic device 200 and an application program related to various electronic device functions supported by the second electronic device 200. For example, the second electronic device storage unit 250 may store a text editing program, an image editing program, a video reproduction program, a video editing program, a file search and transmission/reception program and the like. Particularly, the second electronic device storage unit 250 stores a server application 262 for supporting the electronic device remote control function according to the present invention.

The server application 262 is a program for supporting the electronic device remote control function of the second electronic device 200. When an input event for activating the electronic device remote control function is generated, the server application 262 is loaded to the second electronic device controller 260 and supports various functions required for the operation of the electronic device remote control function.

For example, the server application 262 may include a routine for the access to the network 400 and a routine for processing a communication connection with a particular first electronic device 100 through an input of designated or authorized authentication information. Further, the server application 262 includes a routine outputting a tray icon for supporting the electronic device remote control function according to the present invention, a routine processing an output of the communication service related event of the first electronic device 100 through the tray icon, and a routine providing a particular event and a control event for processing an event transmitted by the first electronic device 100 to the second electronic device 200. In addition, the server application 262 may include a routine providing a function control event corresponding to an input signal input into the second electronic device input unit 220 and making a request for performing the corresponding function and a routine receiving a result according to the performance of the function and outputting the result. For example, when the second electronic device 200 receives a mouse input, the second electronic device 200 includes a routine transmitting a corresponding coordinate where the mouse is input to the first electronic device 100. When the second electronic device 200 receives a keyboard input, the second electronic device 200 includes a routine transmitting a key input to the first electronic device 100 and a routine transmitting a file between the first electronic device 100 and the second electronic device 200 by a drag and drop event.

The second electronic device controller 260 supports supply and distribution of power required for the operation of the second electronic device 200 and transmission and processing of the performance of the electronic device remote control function according to the present invention.

The second electronic device controller 260 loads the server application 262 to execute an electronic device remote control program when the electronic device remote control program is activated.

When a function of remotely controlling the first electronic device 100 is performed, the server application 262 controls the tray icon to be output on one side of the second electronic device display unit 240 of the second electronic device 200. A tray icon operator 261 supports outputs of various pieces of information related to the first electronic device 100 on the tray icon so that the various pieces of information related to the first electronic device 100 can be easily identified when the second electronic device 200 is operated.

For example, the server application 262 may inform the user that the first electronic device 100 generates the communication service related event by outputting an alarm message or an alarm image related to the communication service related event transmitted by the first electronic device 100. At this time, the tray icon with a predefined limited size is displayed on one side of the screen of the second electronic device display unit 240, so that a particular task is not distributed by the event generated by the first electronic device 100 while the task is performed by the user. Further, the tray icon operator 261 may output at least a part of contents of the data and the control event transmitted to the first electronic device 100 as a text or a particular image through the tray icon and also output at least a part of contents of the particular function control event through the tray icon. In addition, the tray icon operator 261 may receive a result according to the transmission of the function control event and output the result through the tray icon. The user identifies a status of the first electronic device 100 through the tray icon operated by the tray icon operator 261. Further, the user may call a communication service management function, for example, a message writing screen or transmit a reception rejection message by selecting a particular icon or function item displayed on the tray icon.

Meanwhile, the server application 262 may output status information transmitted by the first electronic device 100 in the form of an icon or a text having a predefined shape. For example, the server application 262 may support an output of at least one of reception status information of a message, a multimedia message, an e-mail, or a chatting message of the first electronic device 100, battery residual amount information, operation status information of a short-range communication module, operation status information of a position information collection sensor, communication function related status information, and a particular user program executing in the first electronic device 100, for example, music file play related information on the tray icon. Through the support of such functions, the server application 262 provides information, such that abrupt termination of the electronic device due to power consumption of the first electronic device 100 can be prevented in advance, and induces to control an operation such as charging.

When the server application 262 receives the communication service related event from the first electronic device 100, the server application 262 supports an input of data for processing the corresponding communication service related event and an input of the control event. Particularly, when a communication service related event notification message output on the tray icon is selected, the server application 262 may automatically activate a menu screen including items for processing the corresponding event or a document writer for processing the corresponding event to output the notification message. Further, when a control event making a request for completed data and transmitting the corresponding data is generated, the server application 262 may transmit the control event to the first electronic device 100. Then, the first electronic device 100 may write a message according to the data and the control event transmitted by the server application 262 of the second electronic device 200 and support transmission of the message to another electronic device. Alternatively, the first electronic device 100 may perform a control such that reception of a call connection request of another electronic device is rejected according to the transmitted data and control event.

The server application 262 performs a function of generating a function control event for performing a particular electronic device function of the first electronic device 100 according to the operation of the electronic device remote control function in a state where the communication connection with the first electronic device 100 is made, and performs a function of transmitting the generated function control event. To this end, the server application 262 provides electronic device functions which can be operated by the first electronic device 100 according to a user request in a list form and supports an output of an editor which can generate various function control events for controlling a function of the first electronic device 100 selected from the corresponding list. The user controls the second electronic device 200 to generate a function control event used for controlling a particular function which can be operated by the first electronic device 100 by using the editor.

As described above, the second electronic device 200 according to the embodiment of the present invention may receive an alarm of an activation of a function related to the first electronic device 100 as an event without storing separate data related to the first electronic device 100 and output the received event, so as to provide information for managing and controlling the first electronic device 100 to the user.

A type of operation in which the second electronic device 200 performs the function of the first electronic device 100 may follow a response/request type based on HTTP and APIs may be newly defined to support the electronic device remote control function according to the present invention. Each of the defined APIs is included in the electronic device remote control program and stored in the first electronic device 100 and the second electronic device 200 and is used for supporting each of the functions according to the activation of the electronic device remote control function according to the present invention.

The system for supporting the electronic device remote control function according to an embodiment of the present invention and components of the system have been described. Hereinafter, a method of operating the system for supporting the electronic device remote control function according to the present invention will be described in more detail with reference to the drawings.

First, FIG. 4 is a signal flow diagram describing a file transmission/reception function between the first electronic device and the second electronic device of the electronic device remote control function according to an embodiment of the present invention.

Referring to FIG. 4, the system operating method for supporting the file transmission/reception function between the first electronic device and the second electronic device according to the present invention supports such that each of the first electronic device 100 and the second electronic device 200 maintains a standby state or performs a unique user function according to a user's control in steps 401 and 402. For example, the first electronic device 100 may perform a file reproduction function, and the second electronic device 200 may activate a document writer and support document writing according to an input signal.

Next, the first electronic device 100 and the second electronic device 200 activate the client application and the server application according to a user's control in steps 403 and 404, respectively. Actually, it does not matter if a time when the first electronic device 100 activates the application and a time when the second electronic device 200 activates the application are not the same. The first electronic device 100 and the second electronic device 200 may access the network 400 according to the activation of the client application and the activation of the server application.

For example, when the first electronic device 100 accesses the network 400, the first electronic device 100 supports an output of authentication information on the first electronic device display unit 140 for a communication connection with the second electronic device 200 in step 405. The authentication information may be information required by the second electronic device 200 for the communication connection with the first electronic device 100. Meanwhile, when the access to the network 400 is completed, the second electronic device 200 performs a search for a device to be interworked for the connection with the first electronic device 100, that is, the first electronic device 100 in step 406.

The first electronic device 100 may display the authentication information while being in a standby state for the operation of the electronic device remote control function in step 407, and the second electronic device 200 makes the communication connection with the first electronic device 100 according to the search for the first electronic device 100 in step 408. Thereafter, the second electronic device 200 is in the standby state for the operation of the electronic device remote control function in step 409. In step 409, the second electronic device 200 maintains the standby state for the electronic device remote control function but may keep another function, for example, the previously performed document writing function maintained.

The first electronic device 100 in the standby state executes the internal explorer application according to the operation of the electronic device remote control function in step 410. A description of the internal explorer application of the first electronic device 100 has been made in the above description with reference to FIGS. 6A to 6C. An execution screen of the internal explorer application may be transmitted to the second electronic device 200 through the network 400 and output on the second electronic device display unit 240.

With reference to FIG. 5, in step 411, at least one file 522 of the execution screen 520 of the internal explorer application of the first electronic device 100 output on the second electronic device display unit 240 is selected by the user and a file transmission event for copying the selected file 522 and pasting the copied file on the second electronic device is generated. For example, the file transmission event may be a drag and drop of dragging at least one file selected on the execution screen of the internal explorer application of the first electronic device 100 output on the second electronic device display unit 240 and dropping the file to an explorer execution screen of the second electronic device displayed on the second electronic device display unit 240.

Then, the first electronic device 100 transmits the file to the second electronic device 200 on standby in connection with the electronic device remote control function via the network 400 according to the generated file transmission event in step 412.

The second electronic device 200 provides notification according to the reception of the transmitted file and displays the received file on a file storage area 512 output on the second electronic device display unit 240 in step 413. At this time, the second electronic device 200 may output the received file on at least one area of the second electronic device display unit 240 other than the file storage area 512 illustrated in FIG. 5 according to a user's control.

Similarly, in step 414, at least one file of the second electronic device 200 output on the second electronic device display unit 240 is selected by the user and a file transmission event for copying the selected file and pasting the copied file on the first electronic device 100 is generated. For example, the file transmission event may be a drag and drop of dragging at least one file output on the second electronic device display unit 240 and dropping the file to the execution screen of the internal explorer application of the first electronic device 100 displayed on the second electronic device display unit 240.

Then, the second electronic device 200 transmits the file to the first electronic device 100 on standby in connection with the electronic device remote control function via the network 400 according to the file transmission event in step 415.

The first electronic device 100 provides notification according to the reception of the transmitted file and displays the received file on the execution screen of the internal explorer application of the first electronic device display unit 140 in step 416. Simultaneously with the above, the first electronic device 100 repeatedly transmits screen compression data to the second electronic device 200, so that a result of the file copied from the second electronic device 200 and pasted on the execution screen of the internal explorer application of the first electronic device 100 is displayed on the second electronic device display unit 240.

FIG. 7 is a signal flow diagram describing a system operating method for remotely processing the second electronic device according to reception of a message of the first electronic device and a call connection request message of the electronic device remote control function according to an embodiment of the present disclosure.

Referring to FIG. 7, in the system operating method of remotely processing the second electronic device according to reception of the message of the first electronic device and the call connection request message according to the present invention, the first electronic device 100 and the second electronic device 200 are in a standby state or may be in a state of performing a particular electronic device function provided by the corresponding electronic device in steps 701 and 702. Thereafter, the first electronic device 100 accesses the network 400 when a request for activating the client application is generated in step 703. Then, the first electronic device 100 outputs authentication information for the connection with the second electronic device 200 on the first electronic device display unit 140 in step 705. Together with the displaying of the authentication information, the first electronic device 100 maintains an electronic device remote control function standby state in step 707.

Meanwhile, the second electronic device 200 also accesses the network 400 according to generation of the activation of the server application in step 704. Further, the second electronic device 200 performs a process of searching for the first electronic device 100 in step 706 and performs a communication connection with the first electronic device 100 through the network 400 by inputting the authentication information of the found first electronic device 100 in step 708. The second electronic device 200 may support such that, when a plurality of first electronic devices are found, a particular electronic device can be selected by providing a list of the corresponding electronic devices. At this time, the second electronic device 200 provides electronic device unique information, for example, a phone number of the first electronic device 100 as identification information to select the particular electronic device. Although it has been described that, when the first electronic device 100 displays the authentication information, the user identifies the authentication information of the first electronic device 100 and inputs the authentication information during a process of making the communication connection with the first electronic device 100, the present invention is not limited thereto. That is, when the second electronic device 200 has made the communication connection with the first electronic device 100, the second electronic device 200 can be automatically connected with the first electronic device 100 without the authentication information inputting process.

Meanwhile, the first electronic device 100 may receive a Short Message Service (SMS) message, a Multi-media Message Service (MMS) message, an E-mail message, a call connection request message, and the like from another electronic device according to support of the communication function in step 709. Then, the first electronic device 100 transmits the corresponding message to the second electronic device 200 in step 710.

The second electronic device 200 makes a message reception notification in step 712. To this end, the second electronic device 200 operates a tray icon and supports an output of a text or an image indicating reception of the message on the tray icon. Thereafter, the second electronic device 200 generates data and a control event according to identification of the message and writing of a response in step 714. The generated data and control event are transmitted to the first electronic device 100 in step 715. When the first electronic device 100 receives the data and executes the control event from the second electronic device 200 in step 716, the first electronic device 100 supports transmission of a message according to the corresponding data and control event to another electronic device. Thereafter, the first electronic device 100 returns to an operation before step 709 to continuously support the electronic device remote control function according to the present invention.

Figure 8A:
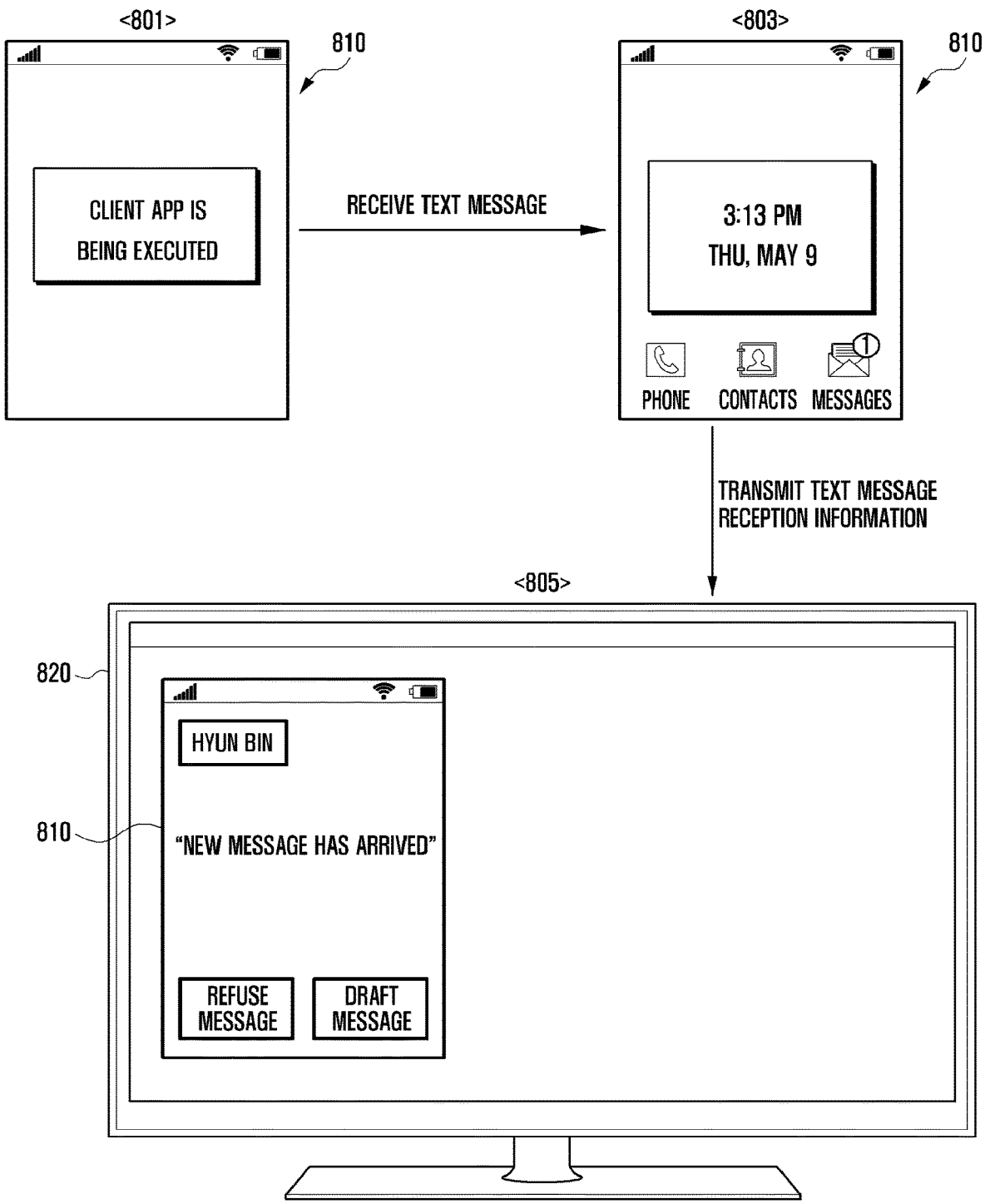
FIGS. 8A and 8B illustrate an example of a screen interface for supporting an electronic device remote control function.
Figure 8B:
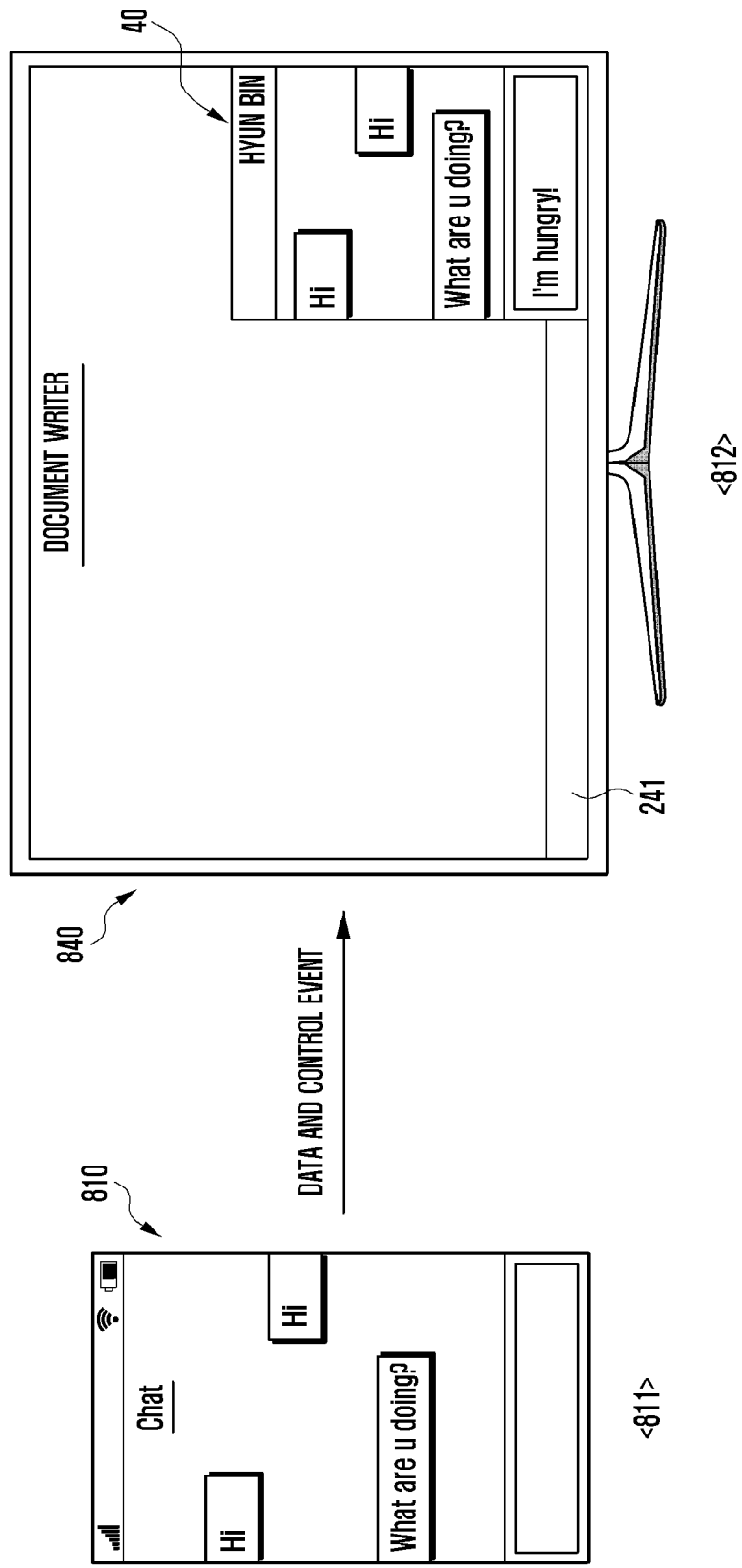

FIGS. 8A and 8B illustrate an example of a screen interface for supporting the electronic device remote control function.

Referring to FIG. 8A, the first electronic device 100 maintains a standby state as illustrated in screen 801 before the communication service related event is generated according to the operation of the electronic device remote control function. Thereafter, when the first electronic device 100 receives the communication service related event, for example, a text message, the first electronic device 100 outputs a screen informing the user of reception of the text message as illustrated in screen 803 by the indication at the "MESSAGES" icon.

Meanwhile, when the first electronic device 100 transmits a text reception message to the second electronic device 200, the second electronic device 200 outputs a guide screen of the text message received from the first electronic device 100 as illustrated in screen 805. The second electronic device 200 may output a tray icon on one side of the screen to support the electronic device remote control function as illustrated in FIG. 9.

Figure 9:
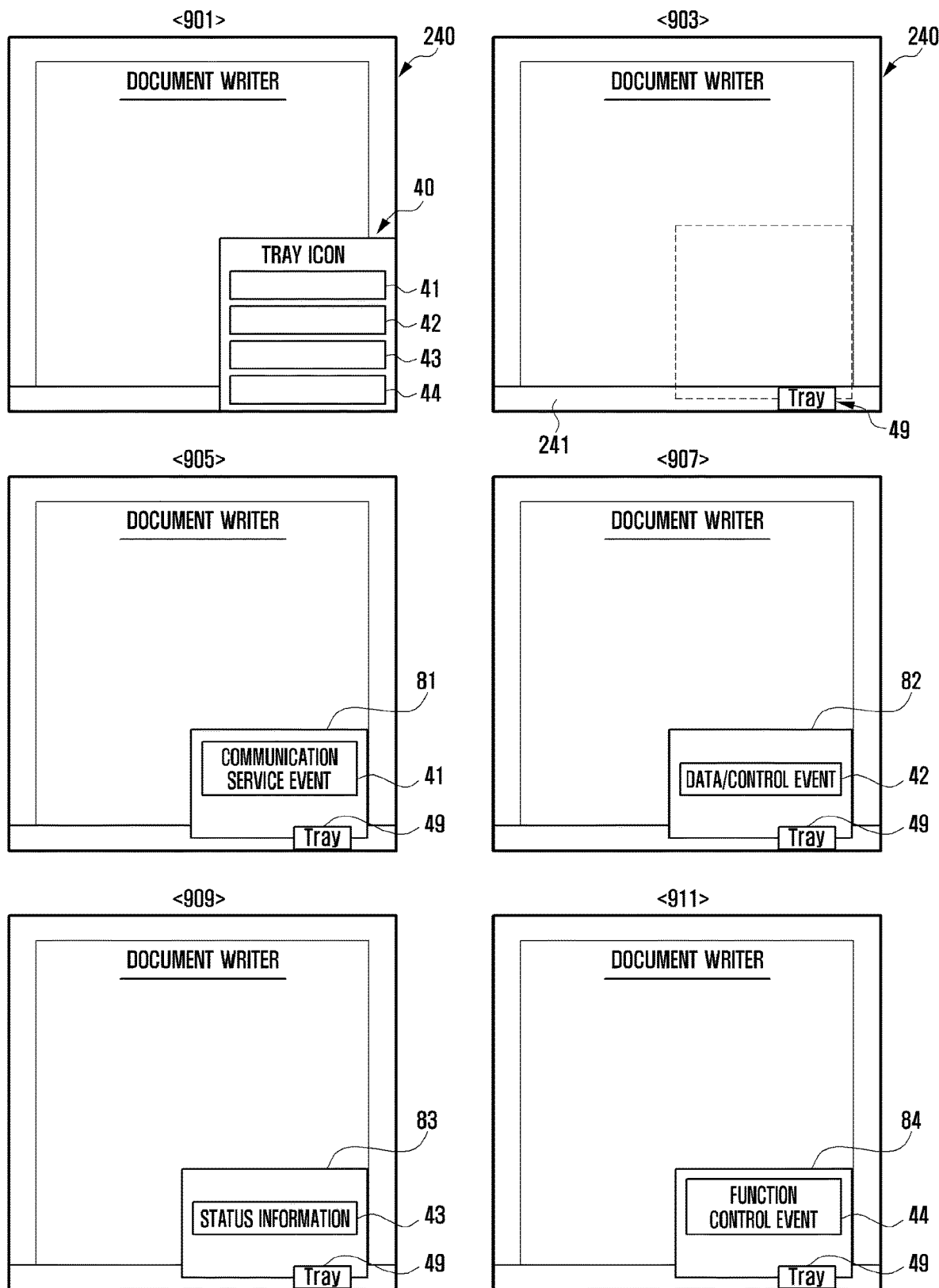
FIG. 9 illustrates an example of an electronic device remote control function according to the present invention.

Referring to FIG. 9, a tray icon 40 may be output on an area of the second electronic device display unit 240. The tray icon 40 includes at least one area of an event output area 41 informing the user of generation of a remote control service related event as illustrated in screen 901, a data and control event supporting area 42, a status information output area 43 outputting status information, and a function control event area 44 for supporting a function control event.

Particularly, the tray icon 40 may be output as a tray basic icon 49 on a task display line 241 in one side of the screen of the second electronic device display unit 240 as illustrated in screen 903. When the user selects the tray basic icon 49, the tray icon may be changed to an expansion icon including at least one of the particular areas displayed on the screen 901. Further, in a state where the tray basic icon 49 is displayed on the task display line 241, the tray icon may be changed to an expansion icon including a particular area according to an event transmitted from the first electronic device 100.

For example, when the first electronic device 100 generates a communication service related event or a file transmission event and the second electronic device 200 receives the generated event, the tray icon 40 may be changed to a first tray expansion icon 81 including the event output area 41 as illustrated in screen 905. Further, when the user of the second electronic device 200 selects an item for copying and pasting the corresponding communication service related event or a file, the tray icon 40 may be changed to a second tray expansion icon 82 including the data and control event supporting area 42 as illustrated in screen 907. The data and control event supporting area 42 may be a message writing screen through which a message to be transmitted to another electronic device can be written or a screen indicating a file storage space area on which a file can be pasted. The user may write a message to be transmitted to another electronic device, control transmission of a reception rejection message of a call connection request message, and paste a file on the second electronic device 200 through the data and control event supporting area 42.

Meanwhile, when electronic device status information is received from the first electronic device 100, the tray icon 40 may be changed to a third tray expansion icon 83 including the status information output area 43 through which status information can be displayed in the form of a text or an image as illustrated in screen 909. The third tray expansion icon 83 may display at least one of reception status information of a message, a multimedia message, an e-mail, or a chat message, battery residual amount information, operation status information of a short-range communication module, operation status information of a position information collection sensor, communication function related status information, and information on a particular user program being executed in the first electronic device 100, for example, music file play related information on the tray icon.

When a request of the user of the second electronic device 200 for supporting a function control event is generated, the tray icon 40 may output a fourth tray expansion icon 84 including the function control event area 44 as illustrated in screen 911. The fourth tray expansion icon 84 may be provided in a form included in the tray icon 40 by default to support a particular user function. For example, the fourth tray expansion icon 84 may be provided in the form of supporting a call log search function stored in the first electronic device 100, a phonebook data search function, and a phonebook data item deletion and generation function.

Referring now to FIG. 8B, the first electronic device 100 may execute a messenger application 810 in a foreground in a state where the client application is executed in a background, and the second electronic device 200 may execute a document writer in the foreground in a state where the server application is executed in the background. The first electronic device 100 and the second electronic device 200 are connected through communication of the network 400 as executed by the server application and the client application. Accordingly, the execution screen of the first electronic device 100 is converted to the screen compression data 151 and repeatedly transmitted to the second electronic device 200, so that a messenger application execution screen 40 may be output on one side of a document writer execution screen 840 of the second electronic device display unit 240.

FIG. 12 is a view describing a method of improving a network communication method of the electronic device remote control function according to an embodiment of the present invention.

Referring to FIG. 12, the first electronic device 100 mainly uses a big-endian as a byte order of Android java and the second electronic device mainly uses a little-endian as an Intel system architecture of Windows. Accordingly, a difference of the byte order is generated during communication between two platforms of the first electronic device 100 and the second electronic device 200.

The network communication method for the electronic device remote control according to the embodiment of the present invention converts a number to a character string and transmits the character string in units of bytes to solve the problem. The byte order problem can be solved by converting the received character string to the number again by using a function such as Atoi and applying the number.

Figure 13:
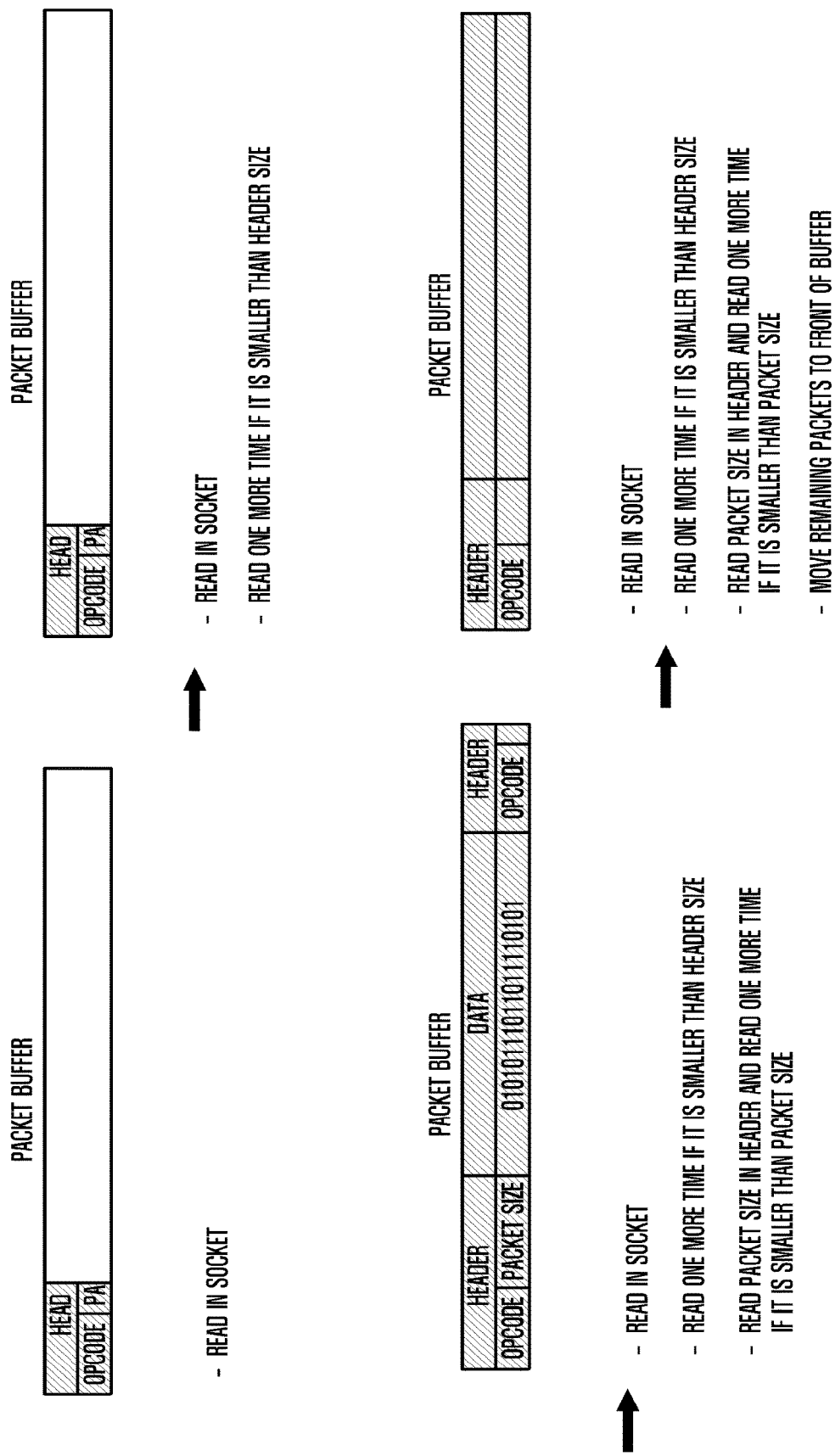
FIG. 13 is a view describing a method of improving data transmission of an electronic device remote control function according to an embodiment of the present invention.

FIG. 13 is a view describing a method of improving data transmission of the electronic device remote control function according to an embodiment of the present invention.

Referring to FIG. 13, the client application and the server application according to an embodiment of the present invention simultaneously perform screen transmission, file transmission, and event transmission. Accordingly, packets are reduced to proper sizes and partitioned. At this time, even though one electronic device transmits one packet, it may not be guaranteed that an electronic device in a receiving side completely receives the packet. When the electronic device does not completely receive the packet, a problem may occur when using a header of the packet and contents of the packet.

A method of transmitting data for the electronic device remote control according to an embodiment of the present invention creates a large reception buffer and reads it in a socket to solve the problem. When the read packet header is smaller than the packet header, the packet header is continuously read until the sizes of the packet headers become the same. When the header is completed, a size of the packet is extracted and the reading is repeated until the sizes become the same. When the packet is completed, other remaining packets after the use are moved to the front of the buffer. Through such logic, the packet loss can be prevented.

Figure 14:
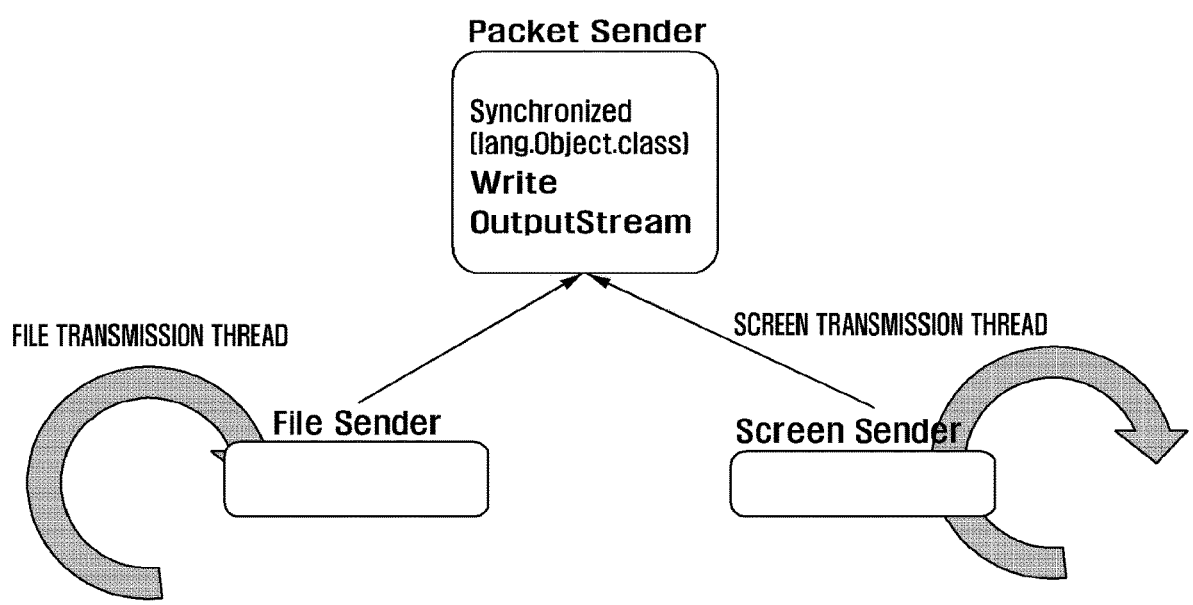
FIG. 14 is a view describing a method of solving a socket output stream synchronization problem of an electronic device remote control function according to an embodiment of the present invention.

FIG. 14 is a view describing a method of solving a socket output stream synchronization problem of the electronic device remote control function according to an embodiment of the present invention.

Referring to FIG. 14, when the first electronic device 100 or the second electronic device 200 transmits a file during screen transmission, they use a socket output stream at the same time. As a result, a synchronization problem may occur. A file sender object and a screen sender object inherit a write function from a packet sender object to use. At this time, they use a synchronized keyword in the write function for the synchronization, but two transmission threads operate in different objects, so that synchronization is not performed and thus the packet may be lost.

A method of synchronizing the socket output stream for the electronic device remote control according to an embodiment of the present invention solves a synchronization problem between different objects by pasting a synchronized keyword to Java.Lang.Object.class corresponding to a global object to solve the problem.

Meanwhile, the first electronic device and the second electronic devices may further include various additional modules according to provision forms thereof. That is, the electronic devices may further include components which have not been mentioned such as a short-range communication module for short-range communication, an interface for data transmission/reception of the electronic devices by a wired communication scheme or a wireless communication scheme, an Internet communication module communicating an Internet network to perform an Internet function, and a digital broadcasting module performing a digital broadcast receiving and reproducing function. Although all such components may not be listed since modifications thereof are diversely made according to a convergence trend of digital devices, components equivalent to the aforementioned components may be further included in the devices. Further, it is apparent that particular components in the electronic devices according to the present invention may be excluded from the components or replaced with other components. This will be easily understood by those skilled in the art to which the present invention pertains.

Further, the electronic devices according to an embodiment of the present invention include all mobile communication terminals operating based on communication protocols corresponding to various communication systems, all information and telecommunication devices and multimedia devices such as a Portable Multimedia Player (PMP), a digital broadcast player, a Personal Digital Assistant (PDA), a music player (for example, an MP3 player), a portable game electronic device, a smart phone, a notebook, and a handheld PC, and application devices thereof.

Meanwhile, although certain embodiments of the present invention have been shown and described in this specification and the drawings, they are used in general sense in order to easily explain technical concepts of the present invention, and to help in the comprehension of the present invention, and are not intended to limit the scope of the present invention. It is obvious to those skilled in the art to which the present invention pertains that other modified embodiments on the basis of the spirit of the present invention besides the embodiments disclosed herein fall within the scope of the invention, as defined by the appended claims and their equivalents.

What is claimed is:

1. A system comprising:
   a first electronic device comprising:
      at least one first communication interface;
      a first memory storing instructions; and
      at least one first hardware processor configured to execute the instructions stored in the first memory to:
         control the at least one first communication interface to connect with a second electronic device over a network,
         obtain, from an external device via the at least one first communication interface, a first message from the external device,
         based on obtaining the first message, control the at least one first communication interface to provide, to the second electronic device over the network, information of the obtained first message, and
         based on obtaining, from the second electronic device via the at least one first communication interface, a second message, controlling the at least one first communication interface to provide the second message to the external device; and
   the second electronic device comprising:
      a second communication interface;
      a second memory storing instructions; and
      at least one second hardware processor configured to execute the instructions stored in the second memory to:
         control the second communication interface to connect with the first electronic device over the network,
         obtain, from the first electronic device via the second communication interface, the information of the first message received by the first electronic device from the external device,
         based on the information of the first message, control to output the first message on a screen of a display,
         obtain a user input, to the second electronic device, of the second message as a reply to the output first message on the screen, and
         based on the user input, control to provide, to the first electronic device via the second communication interface, the second message,
   wherein the at least one second hardware processor is further configured to execute the instructions to control the second communication interface to connect with the first electronic device over the network based on authentication information comprising an e-mail address corresponding to a user of the second electronic device, and
   wherein the at least one second hardware processor is further configured to execute the instructions to:
      control the display to output a user interface including a list of a plurality of applications installed in the first electronic device, each of the plurality of applications being selectable in the list by the user to receive notifications therefor; and
      control the second communication interface to transmit, to the first electronic device, information on one or more applications selected by the user, from the list, for which to receive the notifications from the first electronic device,
   wherein the at least one second hardware processor is further configured to execute the instructions to:
      control the display to output a list of a plurality of electronic devices connectable to the second electronic device over the network via the second communication interface to view notifications therefrom; and
      obtain, from the user via a user input unit, a selection to the list of the first electronic device, from among the plurality of electronic devices, to view notifications therefrom.

2. The system of claim 1, wherein the first electronic device is a mobile phone, and the second electronic device is a personal computer or a laptop computer.

3. The system of claim 1, wherein the first message is a Short Message Service (SMS) message, an e-mail message, or a chat service message received by the first electronic device from the external device.

4. The system of claim 1, wherein:
   the at least one second hardware processor is further configured to execute the instructions to control the display to output the first message in a notification display object on a lower right portion of the screen; and
   the second message is input to the notification display object on the lower right portion of the screen while the first message is displayed and as the reply to the first message.

5. The system of claim 1, wherein the at least one second hardware processor is further configured to execute the instructions to control the second communication interface to connect via Wi-Fi with the first electronic device over the network.

6. The system of claim 1, wherein the at least one second hardware processor is further configured to execute the instructions to control the second communication interface to establish a constant connection with the first electronic device over the network, such that a notification is output on the screen of the display based on any SMS message received by the first electronic device.

7. The system of claim 1, wherein the at least one second hardware processor is further configured to execute the instructions to:
obtain, from the first electronic device via the second communication interface, information on an incoming voice call being received by the first electronic device; and
based on the obtained information of the incoming voice call, control the display to output a notification of the incoming voice call being received by the first electronic device.

8. The system of claim 1, wherein the at least one second hardware processor is further configured to execute the instructions to:
obtain, from the first electronic device via the second communication interface, information on a remaining battery life of the first electronic device; and
based on the obtained information on the remaining battery life, control the display to output an indication of the remaining battery life of the first electronic device,
wherein the indication of the remaining battery life of the first electronic device comprises an icon having a predefined form.

9. The system of claim 1, wherein the at least one second hardware processor is further configured to execute the instructions to output an audio signal based on the obtained information of the first message, to notify that the information of the first message is obtained.

10. A second electronic device comprising:
a display configured to output a screen;
a user input unit,
a communication interface;
a memory storing instructions; and
at least one hardware processor configured to execute the instructions to:
control the communication interface to connect with a first electronic device over a network,
obtain, from the first electronic device via the communication interface, information of a first message received by the first electronic device from an external device,
based on the information of the first message, control the display to output the first message on the screen,
obtain a user input, via the user input unit, of a second message as a reply to the output first message on the screen, and
based on the user input, control to provide, to the first electronic device via the communication interface, the second message for transmitting to the external device as the reply to the first message,
wherein the at least one hardware processor is further configured to execute the instructions to control the communication interface to connect with the first electronic device over the network based on authentication information comprising an e-mail address corresponding to a user of the second electronic device, and
wherein the at least one hardware processor is further configured to execute the instructions to:
control the display to output a user interface including a list of a plurality of applications installed in the first electronic device, each of the plurality of applications being selectable in the list by the user to receive notifications therefor; and
control the communication interface to transmit, to the first electronic device, information on one or more applications selected by the user, via the user input unit from the list, for which to receive the notifications from the first electronic device,
wherein the at least one hardware processor is further configured to execute the instructions to:
control the display to output a list of a plurality of electronic devices connectable to the second electronic device over the network via the communication interface to view notifications therefrom; and
obtain, from the user via the user input unit, a selection to the list of the first electronic device, from among the plurality of electronic devices, to view notifications therefrom.

11. The second electronic device of claim 10, wherein the second electronic device is a personal computer or a laptop computer, and the first electronic device is a mobile phone.

12. The second electronic device of claim 10, wherein the first message is a Short Message Service (SMS) message, an e-mail message, or a chat service message received by the first electronic device from the external device.

13. The second electronic device of claim 10, wherein:
the at least one hardware processor is further configured to execute the instructions to control the display to output the first message in a notification display object on a lower right portion of the screen; and
the second message is input to the notification display object on the lower right portion of the screen while the first message is displayed and as the reply to the first message.

14. The second electronic device of claim 10, wherein the at least one hardware processor is further configured to execute the instructions to control the communication interface to connect via Wi-Fi with the first electronic device over the network.

15. The second electronic device of claim 10, wherein the at least one hardware processor is further configured to execute the instructions to control the communication interface to establish a constant connection with the first electronic device over the network, such that a notification is output on the screen of the display based on any SMS message received by the first electronic device.

16. The second electronic device of claim 10, wherein the at least one hardware processor is further configured to execute the instructions to:
obtain, from the first electronic device via the communication interface, information on an incoming voice call being received by the first electronic device; and
based on the obtained information of the incoming voice call, control the display to output a notification of the incoming voice call being received by the first electronic device.

17. The second electronic device of claim 10, wherein the at least one hardware processor is further configured to execute the instructions to:
obtain, from the first electronic device via the communication interface, information on a remaining battery life of the first electronic device; and
based on the obtained information on the remaining battery life, control the display to output an indication of the remaining battery life of the first electronic device,
wherein the indication of the remaining battery life of the first electronic device comprises an icon having a predefined form.

18. The second electronic device of claim 10, wherein the at least one hardware processor is further configured to execute the instructions to output an audio signal based on the obtained information of the first message, to notify that the information of the first message is obtained.

* * * * *